(12) United States Patent
Li et al.

(10) Patent No.: US 11,543,629 B2
(45) Date of Patent: Jan. 3, 2023

(54) OPTICAL IMAGING SYSTEM INCLUDING FIVE LENSES OF −+−+− OR −+−++ REFRACTIVE POWERS

(71) Applicant: Zhejiang Sunny Optical Co., Ltd, Ningbo (CN)

(72) Inventors: Yang Li, Ningbo (CN); Wuchao Xu, Ningbo (CN); Kaiyuan Zhang, Ningbo (CN); Liefeng Zhao, Ningbo (CN); Fujian Dai, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 290 days.

(21) Appl. No.: 16/928,461

(22) Filed: Jul. 14, 2020

(65) Prior Publication Data

US 2021/0033823 A1 Feb. 4, 2021

(30) Foreign Application Priority Data

Jul. 30, 2019 (CN) .......................... 201910692761.0

(51) Int. Cl.
  *G02B 13/00* (2006.01)
  *G02B 9/60* (2006.01)
(52) U.S. Cl.
  CPC ........... *G02B 13/0045* (2013.01); *G02B 9/60* (2013.01)

(58) Field of Classification Search
  CPC .............................. G02B 13/0045; G02B 9/60
  See application file for complete search history.

(56) References Cited

U.S. PATENT DOCUMENTS

2019/0227278 A1* 7/2019 Chen .................. G02B 13/0045
2020/0379217 A1* 12/2020 Huang .................... G02B 13/04

* cited by examiner

*Primary Examiner* — Wen Huang
(74) *Attorney, Agent, or Firm* — Barnes & Thornburg LLP

(57) ABSTRACT

The present disclosure discloses an optical imaging system including, sequentially from an object side to an image side along an optical axis, a first lens having a negative refractive power with a concave object-side surface and a concave image-side surface; a stop; a second lens having a refractive power; a third lens having a negative refractive power; a fourth lens having a refractive power with a convex object-side surface, and a convex image-side surface; and a fifth lens having a refractive power. Half of a maximal field-of-view Semi-FOV of the optical imaging system satisfies 45.0°≤Semi-FOV<65.0°, and an effective focal length f2 of the second lens and a center thickness CT2 of the second lens along the optical axis satisfy 2.5≤f2/CT2≤3.0.

20 Claims, 11 Drawing Sheets

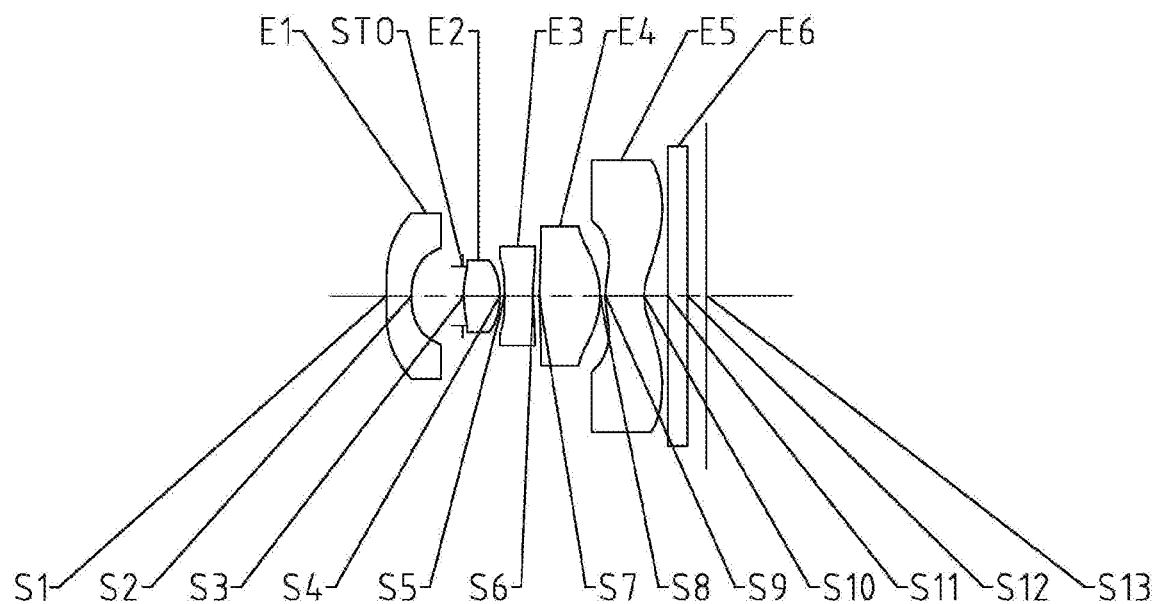
Fig. 9
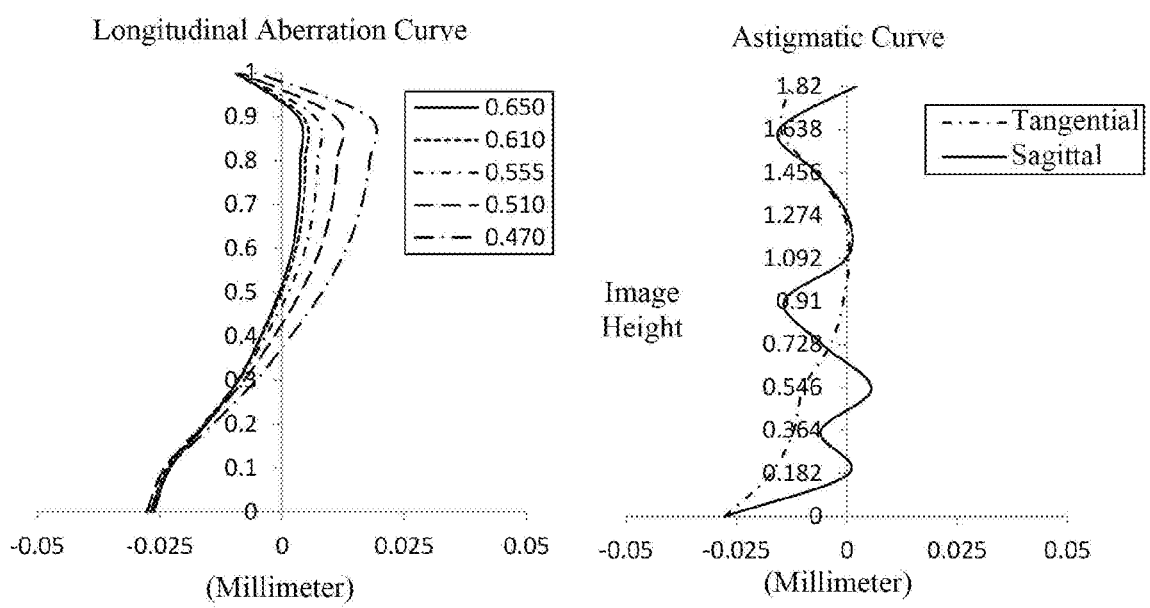
Fig. 10A
Fig. 10B

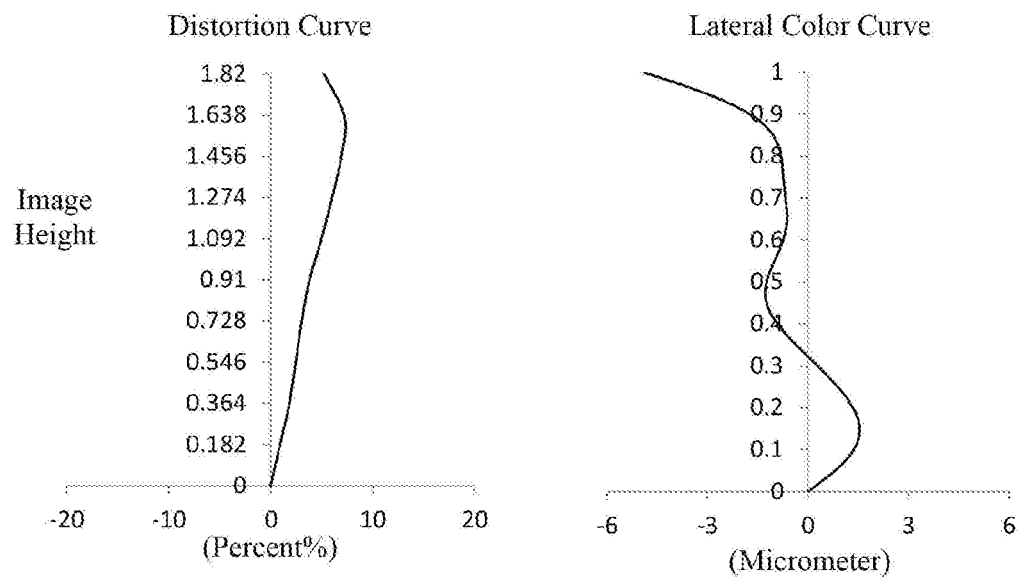
Fig. 10C
Fig. 10D
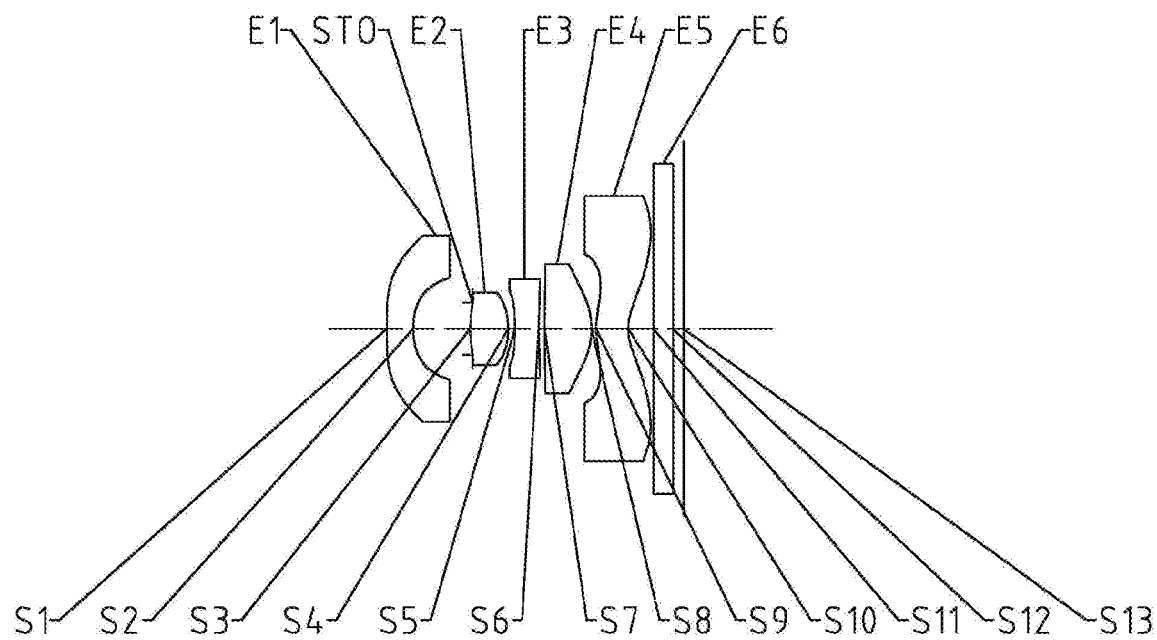
Fig. 11

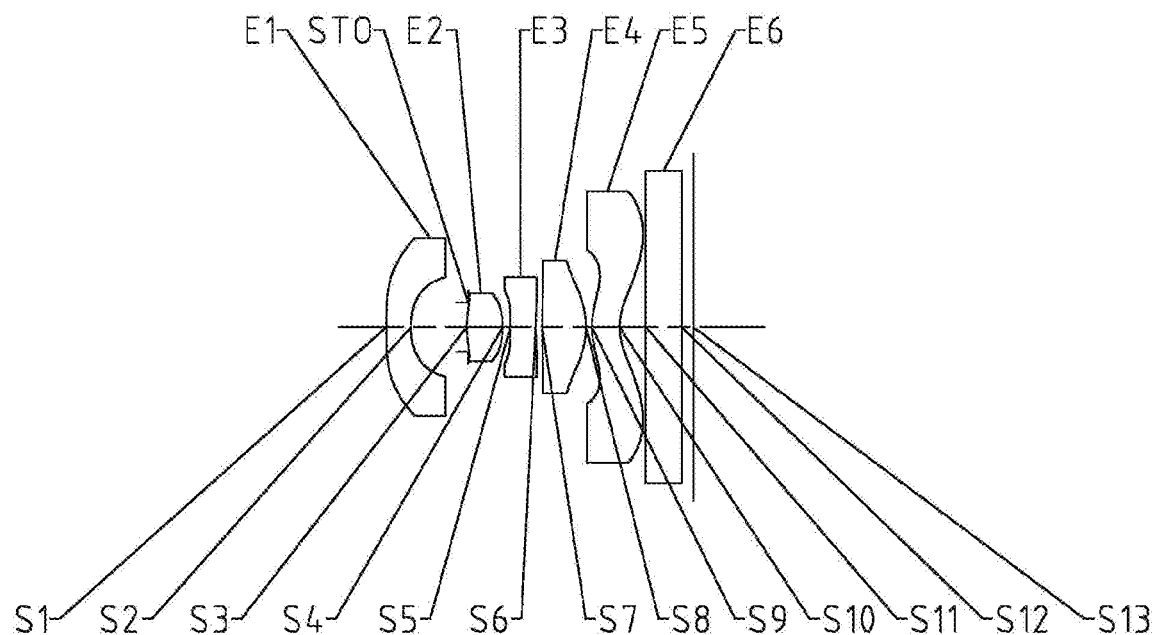
Fig. 13
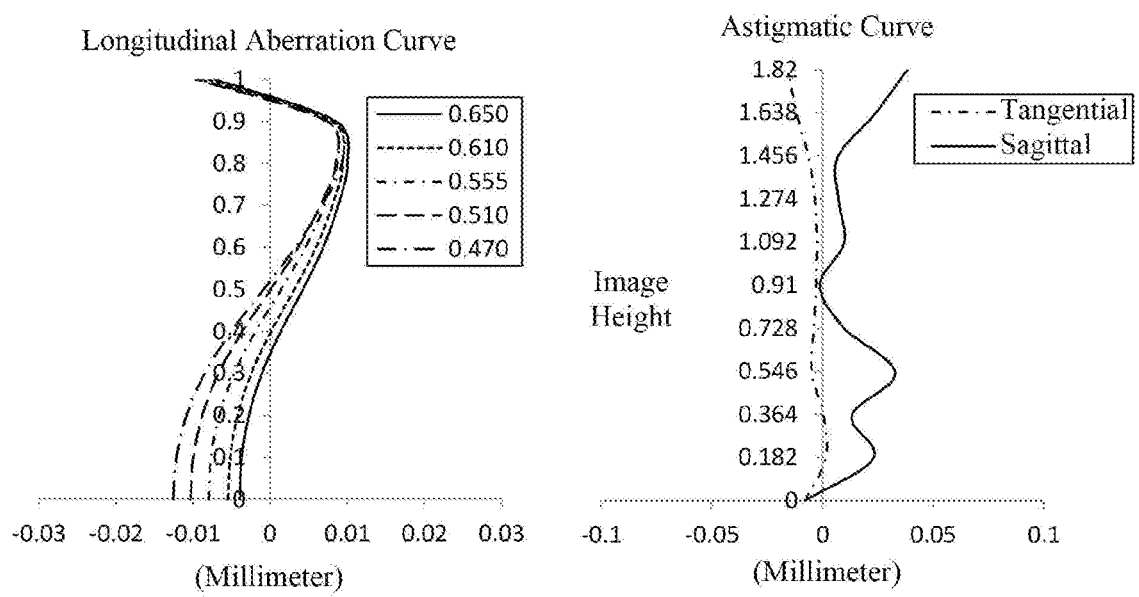
Fig. 14A
Fig. 14B

OPTICAL IMAGING SYSTEM INCLUDING FIVE LENSES OF −+−+− OR −+−++ REFRACTIVE POWERS

CROSS-REFERENCE TO RELATED APPLICATION

This application claims benefit of priority to Chinese Patent Application No. 201910692761.0 filed on Jul. 30, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including five lenses.

BACKGROUND

In recent years, with the development of science and technology, the market demand for imaging systems suitable for portable electronic products has gradually increased. For example, the lens mounted on a mobile phone has developed from a single-camera lens to a multi-camera lens which often includes a wide-angle imaging system. Moreover, the rapid development of mobile phone imaging systems, especially the popularity of large-sized, high-pixel CMOS chips, has caused mobile phone manufacturers to place more stringent requirements on the image quality of the imaging systems. In addition, as the performance of CCD and CMOS elements increases and the size thereof reduces, higher requirements for high image quality and miniaturization are placed on the matched imaging systems.

In order to meet the requirements of miniaturization and imaging requirements, an optical imaging system that can simultaneously satisfy the characteristics of miniaturization, ultra-wide angle and high resolution is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having a negative refractive power with a concave object-side surface and a concave image-side surface; a stop; a second lens having a refractive power; a third lens having a negative refractive power; a fourth lens having a refractive power with a convex object-side surface and a convex image-side surface; and a fifth lens having a refractive power.

In one embodiment, half of a maximal field-of-view Semi-FOV of the optical imaging system may satisfy $45.0° \leq \text{Semi-FOV} < 65.0°$.

In one embodiment, an effective focal length f2 of the second lens and a center thickness CT2 of the second lens along the optical axis may satisfy $2.5 \leq f2/CT2 \leq 3.0$.

In one embodiment, a combined focal length f23 of the second lens and the third lens and an effective focal length f of the optical imaging system may satisfy $1.0 < f23/f \leq 1.6$.

In one embodiment, an effective focal length f4 of the fourth lens and a radius of curvature R8 of the image-side surface of the fourth lens may satisfy $-1.8 \leq f4/R8 \leq -1.3$.

In one embodiment, a radius of curvature R2 of the image-side surface of the first lens and a radius of curvature R3 of an object-side surface of the second lens may satisfy $0.9 \leq R2/R3 \leq 1.7$.

In one embodiment, a radius of curvature R9 of an object-side surface of the fifth lens and a radius of curvature R10 of an image-side surface of the fifth lens may satisfy $1.0 < R9/R10 \leq 2.2$.

In one embodiment, an effective focal length f1 of the first lens and a center thickness CT1 of the first lens along the optical axis may satisfy $-3.6 < (f1/CT1)/4 < -1.6$.

In one embodiment, a center thickness CT2 of the second lens along the optical axis and a spaced interval T23 between the second lens and the third lens along the optical axis may satisfy $2.2 < (CT2/T23)/2 \leq 4.2$.

In one embodiment, a spaced interval T23 between the second lens and the third lens along the optical axis, a spaced interval T34 between the third lens and the fourth lens along the optical axis and a spaced interval T45 between the fourth lens and the fifth lens along the optical axis may satisfy $2.0 < (T23+T34)/T45 < 5.8$.

In one embodiment, a center thickness CT4 of the fourth lens along the optical axis and a center thickness CT5 of the fifth lens along the optical axis may satisfy $1.4 < CT4/CT5 < 2.5$.

In one embodiment, an on-axis distance TTL from the object-side surface of the first lens to an imaging plane of the optical imaging system and a sum of center thicknesses $\Sigma CT$ of the first to fifth lenses along the optical axis may satisfy $1.6 < TTL/\Sigma CT < 2.0$.

In one embodiment, a sum of spaced intervals $\Sigma AT$ along the optical axis between each two adjacent lenses of the first lens to the fifth lens and a spaced interval T12 between the first lens and the second lens along the optical axis may satisfy $1.2 < \Sigma AT/T12 < 1.7$.

In one embodiment, a sum of center thicknesses $\Sigma CT$ of the first to fifth lenses along the optical axis and a center thickness CT4 of the fourth lens along the optical axis may satisfy $2.7 < \Sigma CT/CT4 \leq 3.6$.

In one embodiment, an edge thickness ET3 of the third lens and a center thickness CT3 of the third lens along the optical axis may satisfy $1.2 < ET3/CT3 \leq 1.6$.

In one embodiment, a center thickness CT4 of the fourth lens along the optical axis and an edge thickness ET4 of the fourth lens may satisfy $1.6 < CT4/ET4 < 3.1$.

In one embodiment, an on-axis distance SAG42 from an intersection of the image-side surface of the fourth lens and the optical axis to a vertex of an effective radius of the image-side surface of the fourth lens and an on-axis distance SAG22 from an intersection of an image-side surface of the second lens and the optical axis to a vertex of an effective radius of the image-side surface of the second lens may satisfy $1.8 < SAG42/SAG22 < 4.9$.

In one embodiment, an on-axis distance SAG12 from an intersection of the image-side surface of the first lens and the optical axis to a vertex of an effective radius of the image-side surface of the first lens and an on-axis distance SAG11 from an intersection of the object-side surface of the first lens and the optical axis to a vertex of an effective radius of the object-side surface of the first lens may satisfy $1.0 < SAG12/SAG11 \leq 2.2$.

In one embodiment, a refractive index n3 of the third lens may satisfy $1.6 < n3$, and a refractive index n5 of the fifth lens may satisfy $1.6 < n5$.

The present disclosure employs five lenses, and the optical imaging system has at least one advantageous effect such as large imaging plane, large viewing angle and high resolution and the like by rationally matching the lenses of different materials and rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 9 illustrates a schematic structural view of an optical imaging system according to Example 5 of the present disclosure;

FIGS. 10A to 10D illustrate a longitudinal aberration curve, an astigmatic curve, a distortion curve, and a lateral color curve of the optical imaging system of the Example 5, respectively;

FIG. 11 illustrates a schematic structural view of an optical imaging system according to Example 6 of the present disclosure;

FIG. 13 illustrates a schematic structural view of an optical imaging system according to Example 7 of the present disclosure; and FIGS. 14A to 14D illustrate a longitudinal aberration curve, an astigmatic curve, a distortion curve, and a lateral color curve of the optical imaging system of the Example 7, respectively.

DETAILED DESCRIPTION OF EMBODIMENTS

Figure 1:
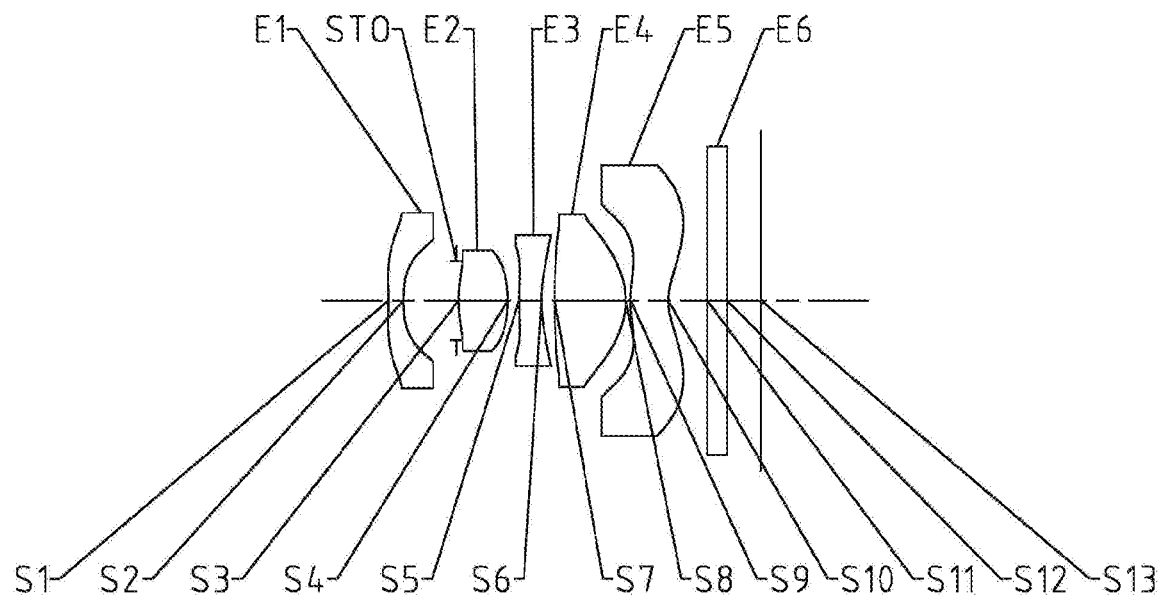
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, five lenses having refractive power, that is, a first lens, a second lens, a third lens, a fourth lens and a fifth lens. The five lenses are arranged sequentially from an object side to an image side along an optical axis. Among the first lens to the five lens, there is an air interval between each two adjacent lenses.

In an exemplary embodiment, the first lens has a negative refractive power, an object-side surface thereof may be a concave surface, and an image-side surface thereof may be a concave surface; the second lens has a positive or a negative refractive power; the third lens has a negative refractive power; the fourth lens has a positive or a negative refractive power, an object-side surface thereof is a convex surface, and an image-side surface thereof is a convex surface; and the fifth lens has a positive or a negative refractive power. By reasonably controlling the positive and negative distribution of the refractive power of each component in the system and the curvature of lens surface, the low-order aberrations of the system may be effectively compensated. The first lens is set to be negative refractive power, while the object-side surface thereof is set as a concave surface and the image-side surface thereof is set as a concave surface. With this arrangement, the light can be converged better, and the optical imaging system has a larger maximum field-of-view, so as to realize an optical imaging system that has both wide-angle and miniaturized structure features.

In an exemplary embodiment, the optical imaging system according to the present disclosure may satisfy: $45.0°≤$Semi-FOV$<65.0°$, where Semi-FOV is half of a maximal field-of-view of the optical imaging system. More specifically, Semi-FOV may satisfy: $45.0°≤$Semi-FOV$<64.5°$. Controlling half of the maximal field-of-view of the optical imaging system allows the optical imaging system to have a wide-angle characteristic.

In an exemplary embodiment, the optical imaging system according to the present disclosure may satisfy: $2.5≤f2/CT2≤3.0$, where f2 is an effective focal length of the second lens and CT2 is a center thickness of the second lens along the optical axis. More specifically, f2 and CT2 may satisfy: $2.51≤f2/CT2≤2.83$. Controlling the ratio of the effective focal length of the second lens to the center thickness of the second lens is beneficial to ensure the second lens have good workability. In addition, controlling the ratio of f2 to CT2 may also reduce the contribution rate of the second lens to the spherical aberration of the optical imaging system.

In an exemplary embodiment, the optical imaging system according to the present disclosure may satisfy: $1.0<f23/f≤1.6$, where f23 is a combined focal length of the second lens and the third lens and f is an effective focal length of the optical imaging system. More specifically, f23 and f may satisfy: $1.15<f23/f<1.59$. By controlling the ratio of the combined focal length of the second lens and the third lens to the effective focal length of the optical imaging system, the aberrations contributed by the second lens and the third lens to the optical imaging system may be controlled, and the aberrations contributed by the second lens and the third lens may be compensated with the aberrations contributed by the optical element at the object side of the second lens, so that the aberrations of the optical imaging system are in an ideal level, thereby making the optical imaging system have a good image quality.

In an exemplary embodiment, the optical imaging system according to the present disclosure may satisfy: $-1.8≤f4/R8≤-1.3$, where f4 is an effective focal length of the fourth lens and R8 is a radius of curvature of the image-side surface of the fourth lens. More specifically, f4 and R8 may satisfy: $-1.79≤f4/R8≤-1.32$. Controlling the ratio of the effective focal length of the fourth lens to the radius of curvature of the image-side surface of the fourth lens is beneficial to match the refractive power of the fourth lens and the refractive power of other lenses to each other, and to make the amount of astigmatic generated by the optical element located at the object side of the fourth lens and the amount of astigmatic generated by the optical element located at the image side of the fourth lens compensate, so that the optical imaging system has a good image quality.

In an exemplary embodiment, the optical imaging system according to the present disclosure may satisfy: $0.9≤R2/R3≤1.7$, where R2 is a radius of curvature of the image-side surface of the first lens and R3 is a radius of curvature of an object-side surface of the second lens. More specifically, R2 and R3 may satisfy: $0.92≤R2/R3≤1.69$. Controlling the ratio of the radius of curvature of the image-side surface of the first lens to the radius of curvature of the object-side surface of the second lens is beneficial to control the deflection angle of the light at the edge area of the optical imaging system, thereby effectively reducing the sensitivity of the optical imaging system.

In an exemplary embodiment, the optical imaging system according to the present disclosure may satisfy: $1.0<R9/R10≤2.2$, where R9 is a radius of curvature of an object-side surface of the fifth lens and R10 is a radius of curvature of an image-side surface of the fifth lens. More specifically, R9 and R10 may satisfy: $1.05<R9/R10≤2.15$. Controlling the radii of curvature of the two surfaces of the fifth lens is beneficial to control the ray angle (CRA) of the edge field-of-view of the optical imaging system, which may effectively reduce the sensitivity of the optical imaging system and make the imaging system better match with the photosensitive chip, so that the optical imaging system has good image quality.

In an exemplary embodiment, the optical imaging system according to the present disclosure may satisfy: $-3.6<(f1/CT1)/4<-1.6$, where f1 is an effective focal length of the first lens and CT1 is a center thickness of the first lens along the optical axis. More specifically, f1 and CT1 may satisfy: $-3.55<(f1/CT1)/4<-1.65$. Controlling the ratio of the effective focal length of the first lens to the center thickness of the first lens is beneficial to make the first lens have better workability, and to reduce the contribution rate of the first lens to the spherical aberration of the optical imaging system, so that the optical imaging lens has good image quality.

In an exemplary embodiment, the optical imaging system according to the present disclosure may satisfy: $2.2<(CT2/T23)/2≤4.2$, where CT2 is a center thickness of the second lens along the optical axis and T23 is a spaced interval between the second lens and the third lens along the optical axis. Controlling the center thickness of the second lens and the spaced interval between the second lens and the third lens to make half of the ratio of CT2 to T23 satisfy the aforementioned conditional expression is beneficial to reduce the intensity of ghost images generated by the second lens and the third lens, and to shorten the track length of the optical imaging system, thereby miniaturizing the optical imaging system.

In an exemplary embodiment, the optical imaging system according to the present disclosure may satisfy: $2.0<(T23+T34)/T45<5.8$, where T23 is a spaced interval between the second lens and the third lens along the optical axis, T34 is a spaced interval between the third lens and the fourth lens along the optical axis and T45 is a spaced interval between the fourth lens and the fifth lens along the optical axis. More specifically, T23, T34 and T45 may satisfy: $2.05<(T23+T34)/T45<5.79$. There is an air interval between each two adjacent lenses of the second lens to the fifth lens. Controlling the ratio of the sum of the two air intervals close to the object-side surface of the fourth lens to the air interval close to the image-side surface of the fourth lens is beneficial to adjust the field curvature of the optical imaging system, so that the off-axis field of the optical imaging system has good image quality.

In an exemplary embodiment, the optical imaging system according to the present disclosure may satisfy: $1.4<CT4/CT5<2.5$, where CT4 is a center thickness of the fourth lens along the optical axis and CT5 is a center thickness of the fifth lens along the optical axis. More specifically, CT4 and CT5 may satisfy: $1.45<CT4/CT5<2.48$. Controlling the ratio of the center thickness of the fourth lens to the center thickness of the fifth lens is beneficial to control the distortion contribution of each field-of-view to the optical imaging system, thereby improving the image quality of the optical imaging system.

In an exemplary embodiment, the optical imaging system according to the present disclosure may satisfy: $1.2<ET3/CT3\leq1.6$, where ET3 is an edge thickness of the third lens and CT3 is a center thickness of the third lens along the optical axis. More specifically, ET3 and CT3 may satisfy: $1.24<ET3/CT3\leq1.58$. By controlling the ratio of the edge thickness of the third lens to the center thickness of the third lens, the thickness of the third lens in the radial direction of the optical axis is uniform to avoid local thinness or overthickness, so that the third lens has good workability and lower molding stress. In addition, such an arrangement facilitates the coating treatment of the third lens.

In an exemplary embodiment, the optical imaging system according to the present disclosure may satisfy: $1.6<TTL/\Sigma CT<2.0$, where TTL is an on-axis distance from the object-side surface of the first lens to an imaging plane of the optical imaging system and $\Sigma CT$ is a sum of center thicknesses of the first to fifth lenses along the optical axis. As an example, $\Sigma CT=CT1+CT2+CT3+CT4+CT5$. More specifically, TTL and $\Sigma CT$ may satisfy: $1.65<TTL/\Sigma CT<1.92$. Controlling the ratio of the total track length of the optical imaging system to the sum of the center thicknesses of lenses is beneficial to limit the distortion range of the optical imaging system, and the optical imaging system with less distortion may have a better image quality.

In an exemplary embodiment, the optical imaging system according to the present disclosure may satisfy: $1.2<\Sigma AT/T12<1.7$, where $\Sigma AT$ is a sum of spaced intervals along the optical axis between each two adjacent lenses of the first lens to the fifth lens and T12 is a spaced interval between the first lens and the second lens along the optical axis. As an example, $\Sigma AT=T12+T23+T34+T45$. More specifically, $\Sigma AT$ and T12 may satisfy: $1.21\leq\Sigma AT/T12\leq1.67$. Controlling the sum of spaced intervals along the optical axis between each two adjacent lenses of the first lens to the fifth lens and the spaced interval between the first lens and the second lens along the optical axis to make the ratio between the $\Sigma AT$ and T12 satisfy the aforementioned conditional expression is beneficial to the reasonable distribution of the air interval between adjacent lenses, which may effectively reduce the interval sensitivity of the optical imaging system, and correct the field curvature of the optical imaging system, thereby making the optical imaging system has a good image quality.

In an exemplary embodiment, the optical imaging system according to the present disclosure may satisfy: $2.7<\Sigma CT/CT4\leq3.6$, where $\Sigma CT$ is a sum of center thicknesses of the first to fifth lenses along the optical axis and CT4 is a center thickness of the fourth lens along the optical axis. More specifically, $\Sigma CT$ and CT4 may satisfy: $2.73<\Sigma CT/CT4\leq3.6$. Controlling the ratio of the sum of the center thicknesses of all lenses to the center thickness of the fourth lens is beneficial to make the fourth lens have good workability. In addition, by doing so, the total track length of the optical imaging system can be further limited, so that the optical imaging system has the characteristics of miniaturization.

In an exemplary embodiment, the optical imaging system according to the present disclosure may satisfy: $1.6<CT4/ET4<3.1$, where CT4 is a center thickness of the fourth lens along the optical axis and ET4 is an edge thickness of the fourth lens. More specifically, CT4 and ET4 may satisfy: $1.61\leq CT4/ET4<3.04$. By controlling the ratio of the center thickness of the fourth lens to the edge thickness of the fourth lens, the thickness of the fourth lens in the radial direction of the optical axis is uniform, so that the fourth lens has good workability and lower molding stress. In addition, such an arrangement facilitates the coating treatment of the fourth lens.

In an exemplary embodiment, the optical imaging system according to the present disclosure may satisfy: $1.8<SAG42/SAG22<4.9$, where SAG42 is an on-axis distance from an intersection of the image-side surface of the fourth lens and the optical axis to a vertex of an effective radius of the image-side surface of the fourth lens and SAG22 is an on-axis distance from an intersection of an image-side surface of the second lens and the optical axis to a vertex of an effective radius of the image-side surface of the second lens. More specifically, SAG42 and SAG22 may satisfy: $1.83<SAG42/SAG22<4.84$. By controlling the ratio of the sagittal height of the fourth lens to the sagittal height of the second lens, the inclination of the image-side surface of the second lens and the inclination of the image-side surface of the fourth lens may be effectively controlled, which are beneficial to reduce the intensity of the ghost image generated between the second lens and the fourth lens.

In an exemplary embodiment, the optical imaging system according to the present disclosure may satisfy: $1.0<SAG12/SAG11\leq2.2$, where SAG12 is an on-axis distance from an intersection of the image-side surface of the first lens and the optical axis to a vertex of an effective radius of the image-side surface of the first lens and SAG11 is an on-axis distance from an intersection of the object-side surface of the first lens and the optical axis to a vertex of an effective radius of the object-side surface of the first lens. More specifically, SAG12 and SAG11 may satisfy: $1.01\leq SAG12/SAG11\leq2.20$. Controlling the ratio between the sagittal heights of the two surfaces of the first lens is beneficial to control the processing opening angle of the first lens, so that the first lens has good workability, thereby facilitating the processes of processing, molding, and coating. In an exemplary embodiment, the optical imaging system further includes a color filter disposed at the object side of the first lens. The intensity of ghost images generated between the color filter and the first lens of the optical imaging system is weak, so that the optical imaging system has a good image quality.

In an exemplary embodiment, the optical imaging system according to the present disclosure may satisfy: $1.6<n3$, where n3 is a refractive index of the third lens. More specifically, n3 may satisfy: $1.67<n3$. In an exemplary embodiment, the optical imaging system according to the present disclosure may satisfy: $1.6<n5$, where n5 is a refractive index of the fifth lens. More specifically, n5 may satisfy: $1.67<n5$. The refractive power of the third lens may be controlled by controlling the refractive index of the third lens, and the refractive power of the fifth lens may be controlled by controlling the refractive index of the fifth lens. Controlling the refractive power of each component of the optical imaging system is beneficial to compensate the low-order aberration of the optical imaging system, and to correct the off-axis aberration of the optical imaging system, so that the tolerance sensitivity of the optical imaging system is reduced, thereby improving the image quality of the optical imaging system and helping to maintain the miniaturization of the optical imaging system.

In an exemplary embodiment, the optical imaging system described above may further include at least one stop. The stop may be disposed at an appropriate position as needed, for example, between the first lens and the second lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as five lenses as described above. By properly assigning the refractive power of each lens, the surface shape, the center thickness of each lens, and on-axis spaced intervals between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as large imaging plane, large viewing angle, and high resolution.

In the embodiments of the present disclosure, at least one of the surfaces of each lens is aspheric, that is, at least one of the object-side surface and the image-side surface of each of the first lens, the second lens, the third lens, the fourth lens, and the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens and the fifth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking five lenses as an example, the optical imaging system is not limited to include five lenses. The optical imaging system may also include other numbers of lenses if desired.

Some specific examples of an optical imaging system applicable to the above embodiment will be further described below with reference to the accompanying drawings.

EXAMPLE 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 700.0000 | | | | |
| S1 | aspheric | −2.9621 | 0.1609 | 1.55 | 56.1 | −2.28 | 0.5424 |
| S2 | aspheric | 2.1883 | 0.6205 | | | | 0.7036 |
| STO | spherical | infinite | −0.0410 | | | | |
| S3 | aspheric | 1.7294 | 0.5191 | 1.55 | 56.1 | 1.46 | 1.1405 |
| S4 | aspheric | −1.3275 | 0.1176 | | | | −6.3114 |
| S5 | aspheric | 3.1811 | 0.2350 | 1.68 | 19.3 | −3.91 | 15.4886 |
| S6 | aspheric | 1.4020 | 0.1407 | | | | −2.2595 |
| S7 | aspheric | 19.4108 | 0.7500 | 1.55 | 56.1 | 1.50 | 44.9110 |
| S8 | aspheric | −0.8449 | 0.0499 | | | | −0.2356 |
| S9 | aspheric | 1.4171 | 0.4000 | 1.67 | 20.4 | −2.38 | 0.5279 |
| S10 | aspheric | 0.6633 | 0.4097 | | | | −2.1660 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S11 | spherical | infinite | 0.2100 | 1.52 | 64.2 | | |
| S12 | spherical | infinite | 0.3576 | | | | |
| S13 | spherical | infinite | | | | | |

In example 1, an effective focal length f of the optical imaging system is 1.45 mm, an aperture value Fno of the optical imaging system is 2.26, an on-axis distance TTL from the object-side surface S1 of the first lens E1 to the imaging plane S13 is 3.93 mm, half of a diagonal length ImgH of an effective pixel area on the imaging plane S13 is 1.82 mm, and half of a maximal field-of-view Semi-FOV is 59.5°.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

Figures 2A, 2B:
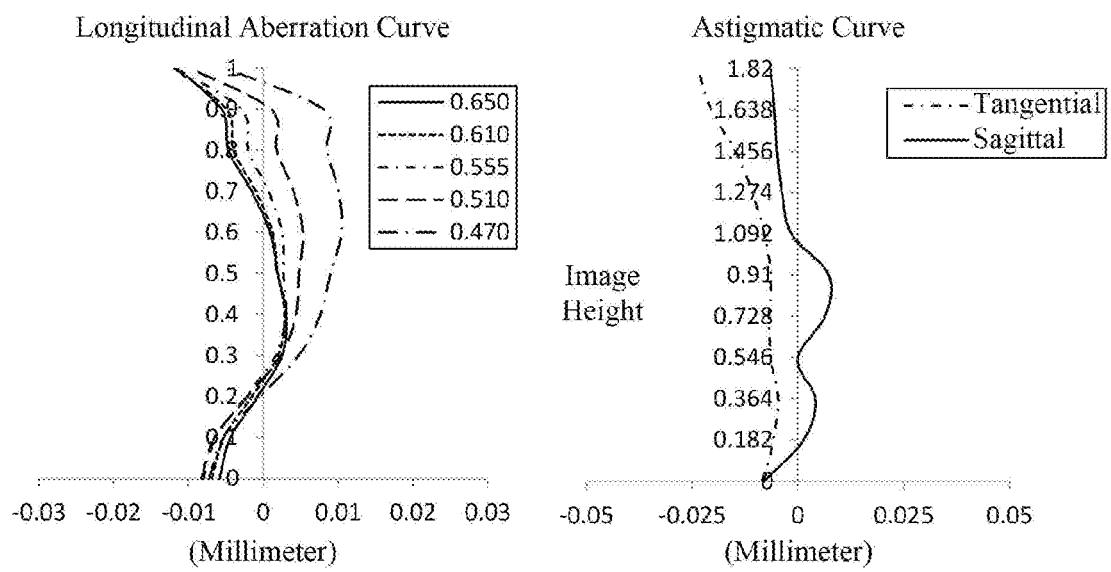
FIGS. 2A to 2D illustrate a longitudinal aberration curve, an astigmatic curve, a distortion curve, and a lateral color curve of the optical imaging system of the Example 1, respectively.
Figure 2C:
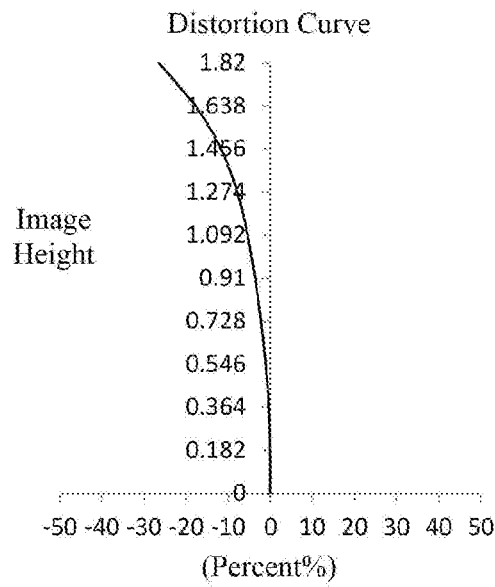
Figure 2D:
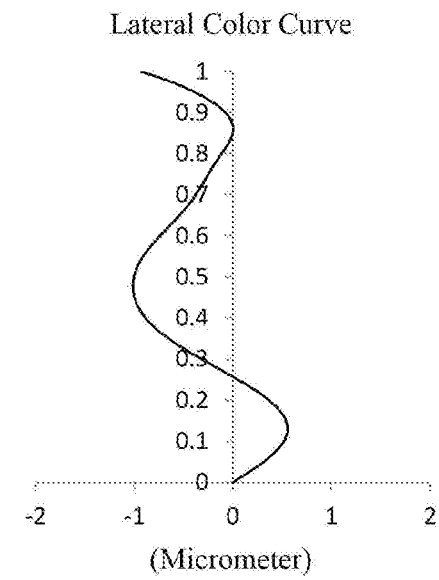

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different image heights. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve a good image quality.

EXAMPLE 2

Figure 3:
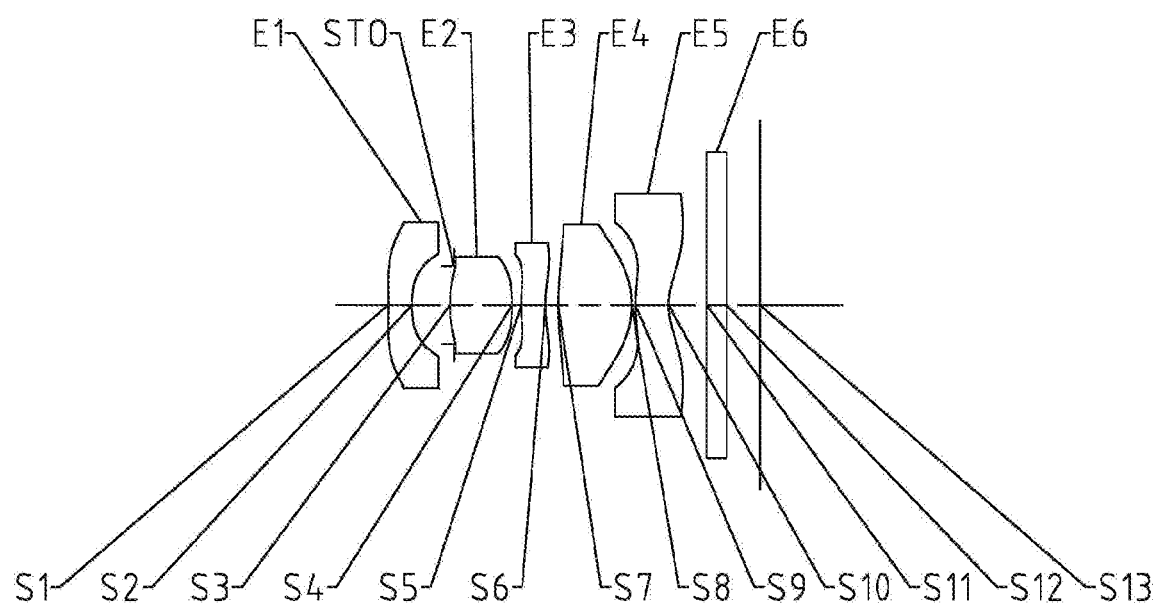
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a stop STO, a second lens E2, a third lens E3, a fourth lens E4, a fifth lens E5 and an optical filter E6,

TABLE 2

| Surface number | A4 | A6 | A8 | A10 | A12 |
|---|---|---|---|---|---|
| S1 | 1.7877E+00 | −6.3014E+00 | 2.0239E+01 | −5.0915E+01 | 9.1593E+01 |
| S2 | 2.1572E+00 | −4.8311E+00 | 7.8418E+00 | 5.0386E+01 | −4.3513E+02 |
| S3 | −1.2377E−01 | −2.7503E+00 | 1.1736E+02 | −3.0471E+03 | 4.4039E+04 |
| S4 | −7.5595E−01 | −3.3045E+00 | 8.3971E+01 | −1.0341E+03 | 7.4954E+03 |
| S5 | −9.7507E−01 | −7.9346E−01 | 2.4308E+01 | −1.6406E+02 | 4.3494E+02 |
| S6 | −3.1561E−01 | −3.4531E+00 | 3.7727E+01 | −2.0353E+02 | 6.8013E+02 |
| S7 | 6.0691E−01 | 4.6479E+00 | 2.3173E+01 | −7.7776E+01 | 1.7271E+02 |
| S8 | 1.8952E−01 | −5.0986E−01 | 7.8952E+00 | −4.4845E+01 | 1.4821E+02 |
| S9 | −1.2315E+00 | 7.8957E−01 | 1.0256E−01 | −1.1766E−01 | −3.4684E+00 |
| S10 | −1.3137E+00 | 2.8447E+00 | −4.7303E+00 | 5.7719E+00 | −5.0314E+00 |

| Surface number | A14 | A16 | A18 | A20 |
|---|---|---|---|---|
| S1 | −1.1296E+02 | 8.9896E+01 | −4.1298E+01 | 8.2792E+00 |
| S2 | 1.6470E+03 | −3.6451E+03 | 4.3269E+03 | −2.1000E+03 |
| S3 | −3.8179E+05 | 1.9630E+06 | −5.5228E+06 | 6.5454E+06 |
| S4 | −3.4015E+04 | 9.4291E+04 | −1.4617E+05 | 9.6856E+04 |
| S5 | 4.2833E+02 | −5.9096E+03 | 1.4367E+04 | −1.1889E+04 |
| S6 | −1.4152E+03 | 1.7285E+03 | −1.0657E+03 | 2.1606E+02 |
| S7 | −2.4070E+02 | 1.8981E+02 | −6.5036E+01 | 1.0677E+00 |
| S8 | −2.9748E+02 | 3.5717E+02 | −2.3497E+02 | 6.5321E+01 |
| S9 | 7.2779E+00 | −6.7199E+00 | 3.4408E+00 | −8.2597E−01 |
| S10 | 3.0037E+00 | −1.1557E+00 | 2.5675E−01 | −2.4923E−02 | which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 2, an effective focal length f of the optical imaging system is 1.46 mm, an aperture value Fno of the optical imaging system is 2.27, an on-axis distance TTL from the object-side surface S1 of the first lens E1 to the imaging plane S13 is 3.94 mm, half of a diagonal length ImgH of an effective pixel area on the imaging plane is 1.82 mm, and half of a maximal field-of-view Semi-FOV is 50.0°.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Refractive index | Abbe number | Focal length | Conic coefficient |
|---|---|---|---|---|---|---|---|
| OBJ | spherical | infinite | 700.0000 | | | | |
| S1 | aspheric | −3.8687 | 0.2500 | 1.55 | 56.1 | −1.82 | 6.4877 |
| S2 | aspheric | 1.3717 | 0.4650 | | | | 1.7951 |
| STO | spherical | infinite | −0.0628 | | | | |
| S3 | aspheric | 1.3855 | 0.6581 | 1.55 | 56.1 | 1.68 | 0.6637 |
| S4 | aspheric | −2.2511 | 0.0972 | | | | −1.0387 |
| S5 | aspheric | 1.7457 | 0.2569 | 1.68 | 19.3 | −12.93 | −6.9609 |
| S6 | aspheric | 1.3691 | 0.1340 | | | | −7.4893 |
| S7 | aspheric | 2.9486 | 0.7799 | 1.55 | 56.1 | 1.46 | 1.3944 |
| S8 | aspheric | −0.9913 | 0.0400 | | | | −0.0288 |
| S9 | aspheric | 1.4039 | 0.3491 | 1.67 | 20.4 | −2.29 | 0.5659 |
| S10 | aspheric | 0.6590 | 0.4073 | | | | −2.9575 |
| S11 | spherical | infinite | 0.2100 | 1.52 | 64.2 | | |
| S12 | spherical | infinite | 0.3552 | | | | |
| S13 | spherical | infinite | | | | | |

TABLE 4

| Surface number | A4 | A6 | A8 | A10 | A12 |
|---|---|---|---|---|---|
| S1 | 1.3354E+00 | −3.8753E+00 | 1.1613E+01 | −2.7586E+01 | 4.6715E+01 |
| S2 | 1.9831E+00 | −4.5299E+00 | 4.0979E+01 | −4.0335E+02 | 3.6491E+03 |
| S3 | 5.0685E−02 | −3.5964E+00 | 1.0923E+02 | −2.1836E+03 | 2.5190E+04 |
| S4 | −1.8014E+00 | 4.3559E+00 | 7.6506E+00 | −3.7143E+02 | 3.3649E+03 |
| S5 | −1.9687E+00 | 5.4961E+00 | −5.6827E+01 | 6.6839E+02 | −5.7012E+03 |
| S6 | −6.8289E−01 | −1.6325E+00 | 2.0755E+01 | −9.1971E+01 | 1.8736E+02 |
| S7 | 5.4237E−02 | −3.3923E+00 | 2.1108E+01 | −8.5576E+01 | 2.6528E+02 |
| S8 | −1.3435E−01 | 1.9002E+00 | −1.0276E+01 | 3.8425E+01 | −9.1932E+01 |
| S9 | −1.6036E+00 | 2.6911E+00 | −1.1657E+01 | 4.7224E+01 | −1.2350E+02 |
| S10 | −1.0584E+00 | 2.0106E+00 | −2.8946E+00 | 3.1821E+00 | −2.5208E+00 |

| Surface number | A14 | A16 | A18 | A20 |
|---|---|---|---|---|
| S1 | −5.3153E+01 | 3.7899E+01 | −1.5116E+01 | 2.5433E+00 |
| S2 | −2.1684E+04 | 7.7089E+04 | −1.4792E+05 | 1.1554E+05 |
| S3 | −1.7518E+05 | 7.1036E+05 | −1.5174E+06 | 1.2600E+06 |
| S4 | −1.6864E+04 | 5.0009E+04 | −8.2074E+04 | 5.7308E+04 |
| S5 | 3.0245E+04 | −9.6754E+04 | 1.7086E+05 | −1.2721E+05 |
| S6 | 1.2360E+01 | −9.4608E+02 | 1.9360E+03 | −1.3081E+03 |
| S7 | −5.9168E+02 | 8.4823E+02 | −6.8289E+02 | 2.3253E+02 |
| S8 | 1.4621E+02 | −1.4562E+02 | 7.9154E+01 | −1.7179E+01 |
| S9 | 2.0444E+02 | −2.0839E+02 | 1.1796E+02 | −2.8058E+01 |
| S10 | 1.3586E+00 | −4.6964E−01 | 9.4867E−02 | −8.6746E−03 |

Figure 4A:
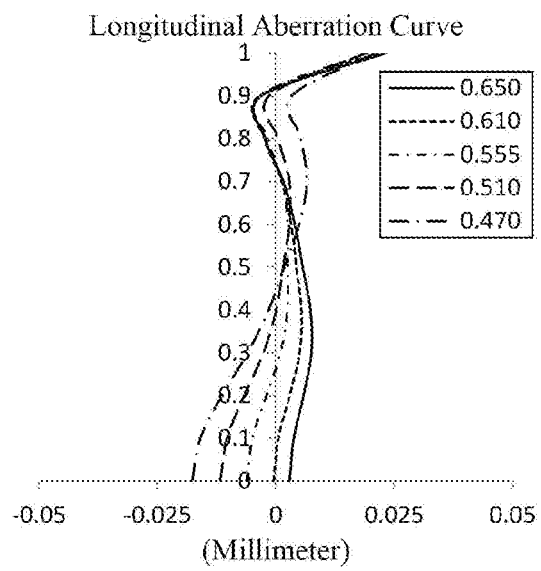
FIGS. 4A to 4D illustrate a longitudinal aberration curve, an astigmatic curve, a distortion curve, and a lateral color curve of the optical imaging system of the Example 2, respectively.
Figure 4B:
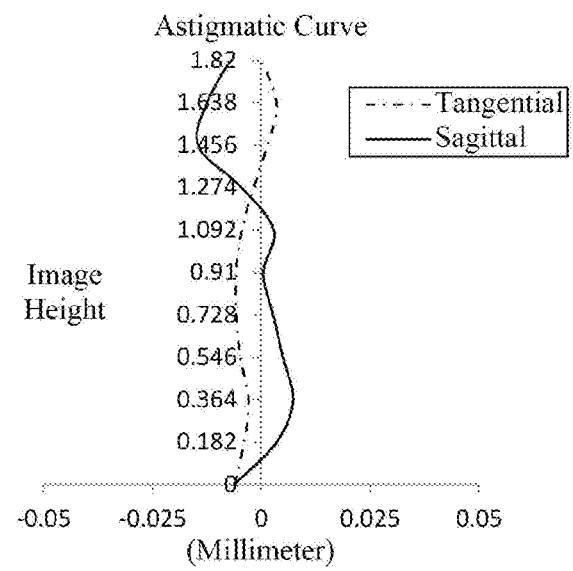
Figure 4C:
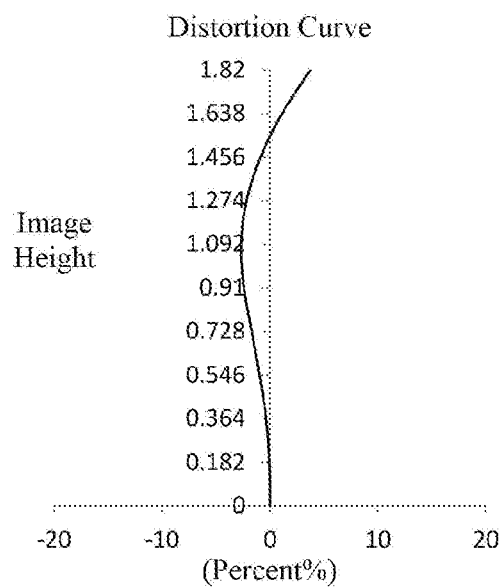
Figure 4D:
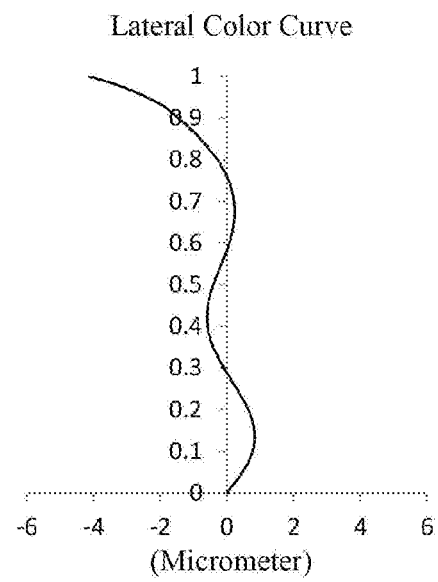

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion at different image heights. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve a good image quality.

EXAMPLE 3

Figure 5:
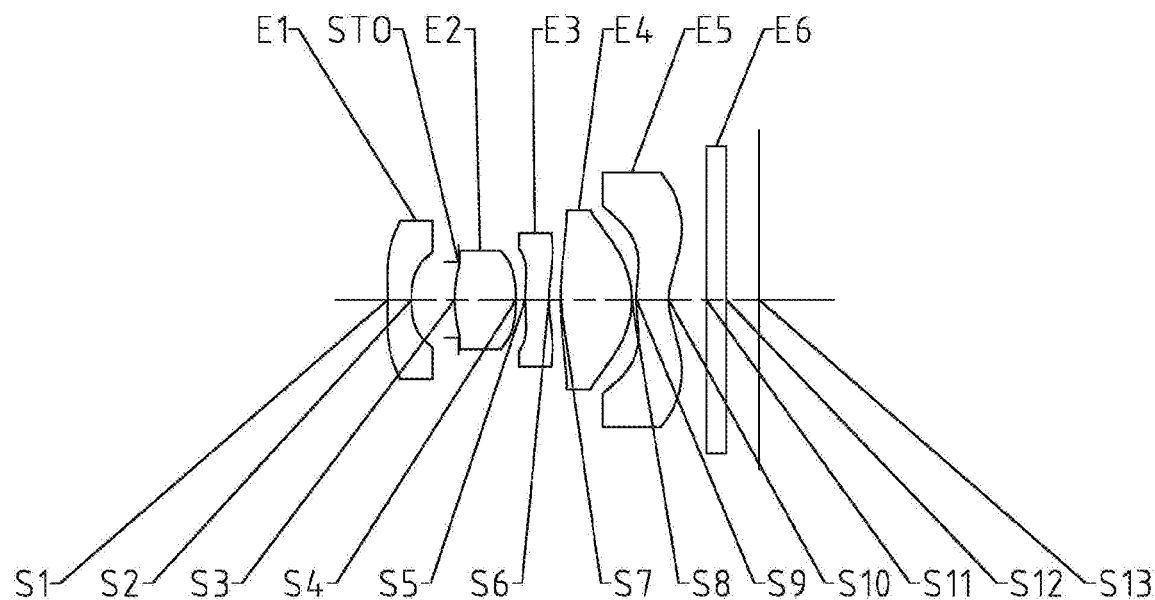
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 3, an effective focal length f of the optical imaging system is 1.37 mm, an aperture value Fno of the optical imaging system is 2.27, an on-axis distance TTL from the object-side surface S1 of the first lens E1 to the imaging plane S13 is 3.93 mm, half of a diagonal length ImgH of an effective pixel area on the imaging plane S13 is 1.82 mm, and half of a maximal field-of-view Semi-FOV is 62.3°.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 700.0000 | | | | |
| S1 | aspheric | −3.3613 | 0.2500 | 1.55 | 56.1 | −1.77 | 6.6809 |
| S2 | aspheric | 1.3873 | 0.4985 | | | | 1.5544 |
| STO | spherical | infinite | −0.0394 | | | | |
| S3 | aspheric | 1.4467 | 0.6499 | 1.55 | 56.1 | 1.68 | 0.2821 |
| S4 | aspheric | −2.0921 | 0.0974 | | | | 0.0280 |
| S5 | aspheric | 1.8051 | 0.2500 | 1.68 | 19.3 | −13.08 | −7.5208 |
| S6 | aspheric | 1.4157 | 0.1219 | | | | −6.7274 |
| S7 | aspheric | 2.9686 | 0.7563 | 1.55 | 56.1 | 1.45 | 1.9840 |
| S8 | aspheric | −0.9836 | 0.0486 | | | | −0.0168 |
| S9 | aspheric | 1.4420 | 0.3420 | 1.67 | 20.4 | −2.34 | 0.8211 |
| S10 | aspheric | 0.6787 | 0.4004 | | | | −2.7349 |
| S11 | spherical | infinite | 0.2100 | 1.52 | 64.2 | | |
| S12 | spherical | infinite | 0.3483 | | | | |
| S13 | spherical | infinite | | | | | |

TABLE 6

| Surface number | A4 | A6 | A8 | A10 | A12 |
|---|---|---|---|---|---|
| S1 | 1.4554E+00 | −4.3793E+00 | 1.2827E+01 | −2.9725E+01 | 5.0322E+01 |
| S2 | 2.2002E+00 | −6.0506E+00 | 7.4650E+01 | −9.2617E+02 | 7.9491E+03 |
| S3 | 1.2392E−01 | −1.2621E+01 | 5.0585E+02 | −1.1483E+04 | 1.5372E+05 |
| S4 | −1.8294E+00 | 4.6744E+00 | 4.8488E+00 | −3.6875E+02 | 3.3811E+03 |
| S5 | −2.0668E+00 | 1.0357E+01 | −1.5737E+02 | 1.8219E+03 | −1.3730E+04 |
| S6 | −7.5177E−01 | 9.2012E−02 | 7.8897E+00 | −2.9047E+01 | −4.9602E+01 |
| S7 | −2.5478E−02 | −2.4087E+00 | 1.7185E+01 | −6.7746E+01 | 1.6939E+02 |
| S8 | −2.1893E−01 | 2.5446E+00 | −1.4591E+01 | 5.5964E+01 | −1.3302E+02 |
| S9 | −1.6011E+00 | 3.2283E+00 | −1.7614E+01 | 7.2958E+01 | −1.8264E+02 |

TABLE 6-continued

| S10 | −1.0601E+00 | 1.7192E+00 | −1.9814E+00 | 1.5982E+00 | −9.2728E−01 |

| Surface number | A14 | A16 | A18 | A20 |
|---|---|---|---|---|
| S1 | −5.9303E+01 | 4.5435E+01 | −2.0173E+01 | 3.9200E+00 |
| S2 | −4.1405E+04 | 1.2821E+05 | −2.1889E+05 | 1.5710E+05 |
| S3 | −1.2585E+06 | 6.1812E+06 | −1.6719E+07 | 1.9108E+07 |
| S4 | −1.6563E+04 | 4.7531E+04 | −7.5676E+04 | 5.1502E+04 |
| S5 | 6.3972E+04 | −1.7832E+05 | 2.7238E+05 | −1.7518E+05 |
| S6 | 6.5397E+02 | −1.9675E+03 | 2.6454E+03 | −1.3696E+03 |
| S7 | −2.6713E+02 | 2.4856E+02 | −1.1941E+02 | 2.1225E+01 |
| S8 | 1.9864E+02 | −1.7812E+02 | 8.5352E+01 | −1.6039E+01 |
| S9 | 2.7834E+02 | −2.5419E+02 | 1.2780E+02 | −2.7151E+01 |
| S10 | 4.0229E−01 | −1.3319E−01 | 3.0201E−02 | −3.2647E−03 |

Figure 6A:
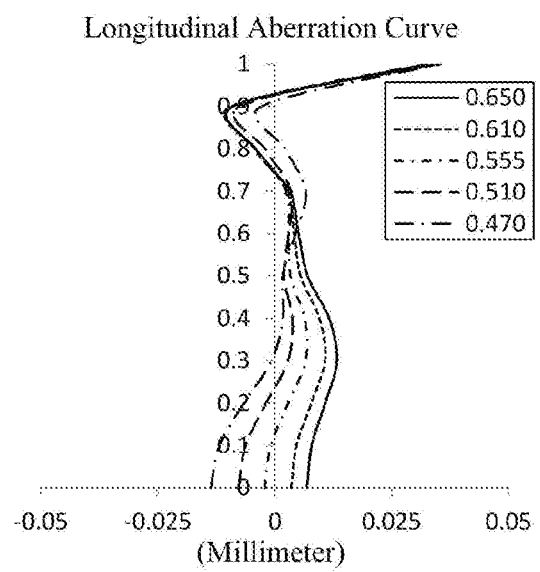
FIGS. 6A to 6D illustrate a longitudinal aberration curve, an astigmatic curve, a distortion curve, and a lateral color curve of the optical imaging system of the Example 3, respectively.
Figure 6B:
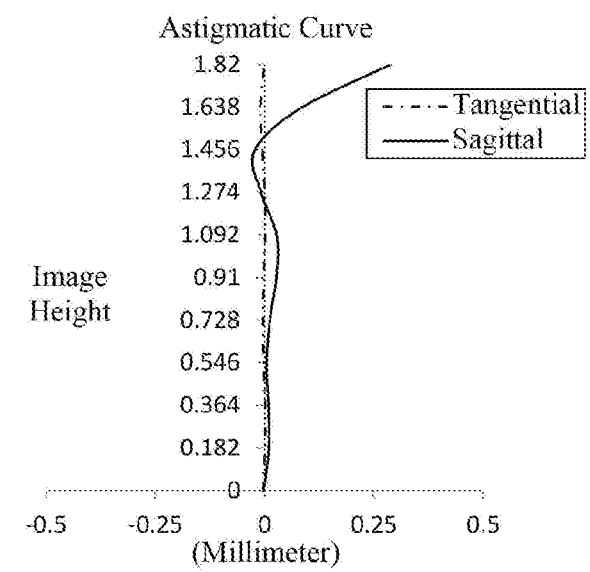
Figure 6C:
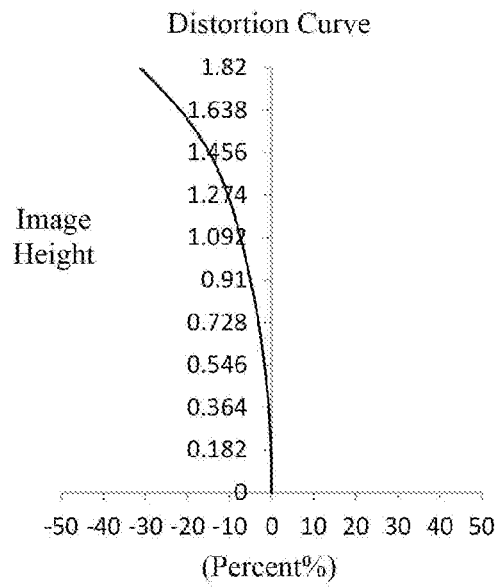
Figure 6D:
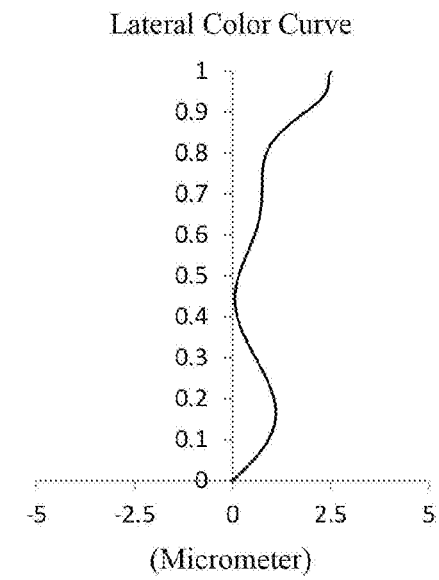

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion at different image heights. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve a good image quality.

EXAMPLE 4

Figure 7:
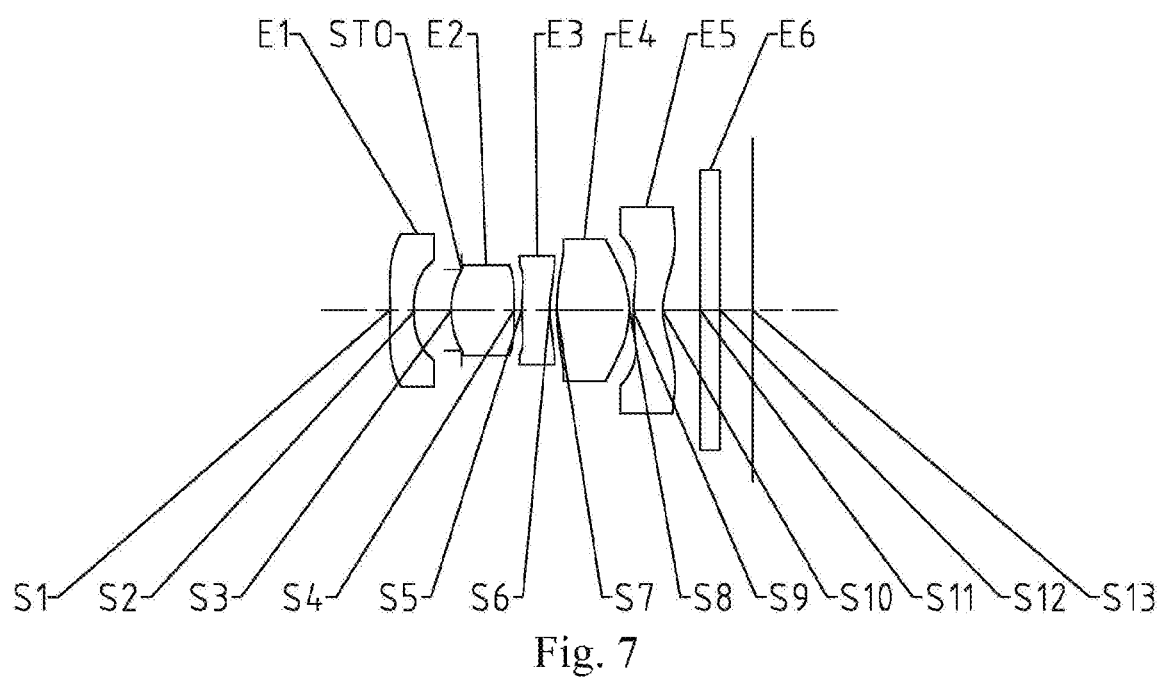
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 4, an effective focal length f of the optical imaging system is 1.51 mm, an aperture value Fno of the optical imaging system is 2.27, an on-axis distance TTL from the object-side surface S1 of the first lens E1 to the imaging plane S13 is 3.82 mm, half of a diagonal length ImgH of an effective pixel area on the imaging plane is 1.82 mm, and half of a maximal field-of-view Semi-FOV is 45.0°.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | spherical | infinite | 700.0000 | | | | |
| S1 | aspheric | −3.4084 | 0.2500 | 1.55 | 56.1 | −1.90 | 7.1557 |
| S2 | aspheric | 1.5241 | 0.5010 | | | | 0.9920 |
| STO | spherical | infinite | −0.1072 | | | | |
| S3 | aspheric | 0.9059 | 0.6630 | 1.55 | 56.1 | 1.81 | 0.4986 |
| S4 | aspheric | 8.1312 | 0.0789 | | | | −92.0385 |
| S5 | aspheric | 1.4163 | 0.2951 | 1.68 | 19.3 | −16.12 | −7.9831 |
| S6 | aspheric | 1.1482 | 0.0764 | | | | −6.5211 |
| S7 | aspheric | 2.0050 | 0.7652 | 1.55 | 56.1 | 1.35 | 1.0405 |
| S8 | aspheric | −1.0131 | 0.0400 | | | | −0.0828 |
| S9 | aspheric | 1.3013 | 0.3098 | 1.67 | 20.4 | −2.80 | 0.3689 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S10 | aspheric | 0.6937 | 0.3956 | | | | −2.7155 |
| S11 | spherical | infinite | 0.2100 | 1.52 | 64.2 | | |
| S12 | spherical | infinite | 0.3435 | | | | |
| S13 | spherical | infinite | | | | | |

TABLE 8

| Surface number | A4 | A6 | A8 | A10 | A12 |
|---|---|---|---|---|---|
| S1 | 1.3020E+00 | −3.8161E+00 | 1.1684E+01 | −2.7664E+01 | 4.4347E+01 |
| S2 | 1.8600E+00 | −7.1638E+00 | 8.9086E+01 | −9.4796E+02 | 7.2378E+03 |
| S3 | −5.7810E−02 | 3.0125E+00 | −8.7508E+01 | 1.3598E+03 | −1.3511E+04 |
| S4 | −1.8908E+00 | 3.0601E+00 | 1.0505E+02 | −2.1358E+03 | 2.0202E+04 |
| S5 | −2.1050E+00 | 8.4999E+00 | −1.1409E+02 | 1.4209E+03 | −1.2437E+04 |
| S6 | −6.0360E−01 | −4.0984E+00 | 6.2280E+01 | −4.5889E+02 | 2.1420E+03 |
| S7 | −1.1620E−03 | −4.6244E+00 | 3.3336E+01 | −1.2084E+02 | 2.1376E+02 |
| S8 | −1.1249E−01 | 2.5817E+00 | −1.8718E+01 | 8.5836E+01 | −2.2355E+02 |
| S9 | −1.6077E+00 | 3.0543E+00 | −2.0425E+01 | 9.4351E+01 | −2.4522E+02 |
| S10 | −1.0459E+00 | 1.2211E+00 | −8.9865E−02 | −1.9651E+00 | 3.2473E+00 |

| Surface number | A14 | A16 | A18 | A20 |
|---|---|---|---|---|
| S1 | −4.2922E+01 | 2.0333E+01 | −1.0870E+00 | −1.8191E+00 |
| S2 | −3.5859E+04 | 1.0845E+05 | −1.7963E+05 | 1.2319E+05 |
| S3 | 8.6896E+04 | −3.5024E+05 | 8.0113E+05 | −7.9124E+05 |
| S4 | −1.1130E+05 | 3.6451E+05 | −6.5903E+05 | 5.0619E+05 |
| S5 | 6.5885E+04 | −1.9872E+05 | 3.0346E+05 | −1.7189E+05 |
| S6 | −6.5685E+03 | 1.2914E+04 | −1.4634E+04 | 7.1676E+03 |
| S7 | −6.0220E+01 | −3.9268E+02 | 5.8052E+02 | −2.5304E+02 |
| S8 | 3.4154E+02 | −2.9992E+02 | 1.3617E+02 | −2.3161E+01 |
| S9 | 3.7702E+02 | −3.4536E+02 | 1.7506E+02 | −3.7813E+01 |
| S10 | −2.7288E+00 | 1.3310E+00 | −3.5674E−01 | 4.0526E−02 |

Figure 8A:
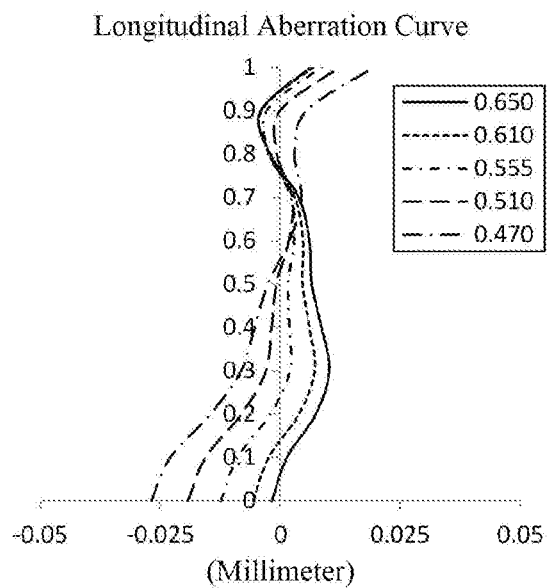
FIGS. 8A to 8D illustrate a longitudinal aberration curve, an astigmatic curve, a distortion curve, and a lateral color curve of the optical imaging system of the Example 4, respectively.
Figure 8B:
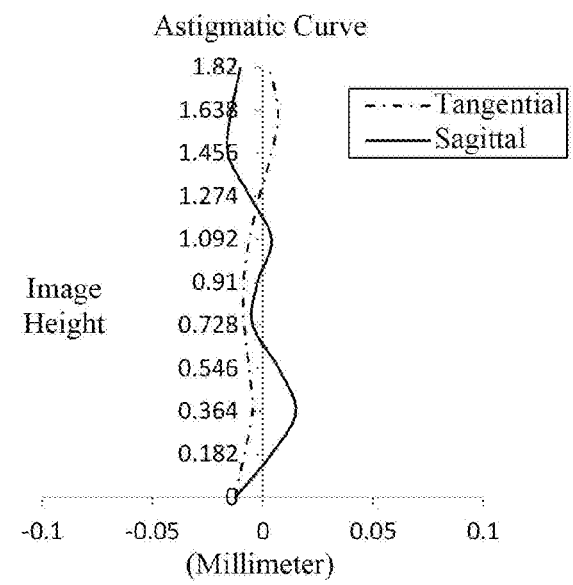
Figure 8C:
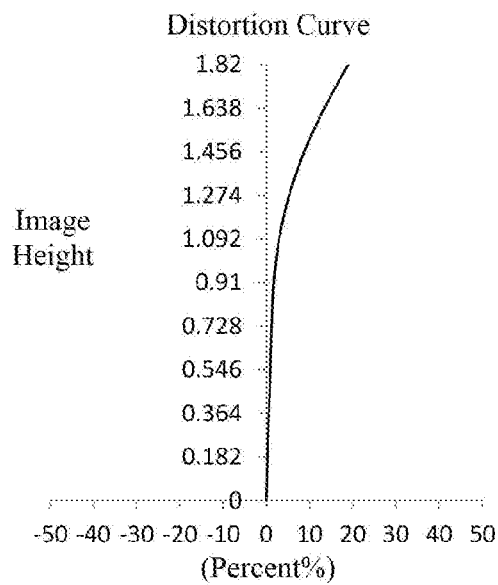
Figure 8D:
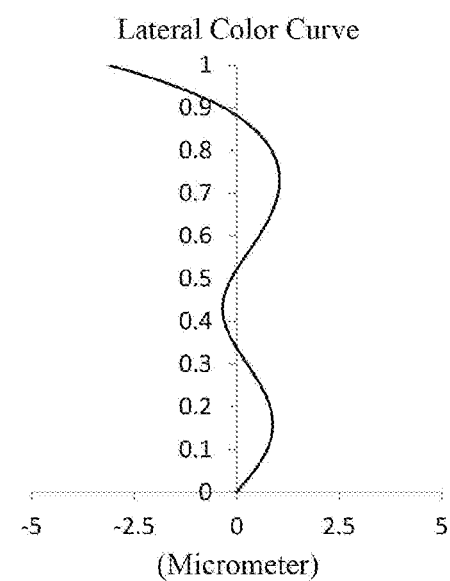

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion at different image heights. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve a good image quality.

EXAMPLE 5

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 5, an effective focal length f of the optical imaging system is 1.08 mm, an aperture value Fno of the optical imaging system is 2.27, an on-axis distance TTL from the object-side surface S1 of the first lens E1 to the imaging plane S13 is 3.39 mm, half of a diagonal length ImgH of an effective pixel area on the imaging plane S13 is 1.82 mm, and half of a maximal field-of-view Semi-FOV is 57.5°.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | spherical | infinite | 700.0000 | | | | |
| S1 | aspheric | −8.4672 | 0.2657 | 1.55 | 56.1 | −1.81 | 12.6018 |
| S2 | aspheric | 1.1316 | 0.5433 | | | | 3.4044 |
| STO | spherical | infinite | 0.0107 | | | | |
| S3 | aspheric | 1.2172 | 0.3820 | 1.55 | 56.1 | 1.05 | −5.0250 |
| S4 | aspheric | −0.9664 | 0.0529 | | | | 3.7373 |
| S5 | aspheric | −11.1217 | 0.2987 | 1.68 | 19.3 | −2.37 | −94.8100 |
| S6 | aspheric | 1.8970 | 0.0663 | | | | −5.6806 |
| S7 | aspheric | 5.0632 | 0.6437 | 1.55 | 56.1 | 1.68 | 1.0283 |
| S8 | aspheric | −1.0680 | 0.0577 | | | | −0.3119 |
| S9 | aspheric | 0.9379 | 0.4081 | 1.67 | 20.4 | −3.98 | −0.0979 |
| S10 | aspheric | 0.5724 | 0.2523 | | | | −3.3528 |
| S11 | spherical | infinite | 0.2100 | 1.52 | 64.2 | | |
| S12 | spherical | infinite | 0.2003 | | | | |
| S13 | spherical | infinite | | | | | |

TABLE 10

| Surface number | A4 | A6 | A8 | A10 | A12 |
|---|---|---|---|---|---|
| S1 | 1.6696E+00 | −6.2545E+00 | 2.2194E+01 | −5.8043E+01 | 1.0729E+02 |
| S2 | 3.1127E+00 | −4.2004E+01 | 6.2869E+02 | −5.0407E+03 | 2.1696E+04 |
| S3 | −1.3548E−01 | 2.9344E+01 | −1.8009E+03 | 5.6614E+04 | −1.0806E+06 |
| S4 | −1.5852E+00 | 1.3377E+01 | −6.8272E+01 | 1.0199E+02 | 3.1968E+02 |
| S5 | −3.0365E+00 | 2.7912E+01 | −3.1033E+02 | 2.6078E+03 | −1.7053E+04 |
| S6 | −6.9314E−01 | −9.6168E+00 | 1.7210E+02 | −1.3662E+03 | 6.3567E+03 |
| S7 | 6.6158E−01 | −1.5688E+01 | 1.4183E+02 | −7.4485E+02 | 2.4407E+03 |
| S8 | −7.0504E−01 | −4.9670E−01 | 4.0689E+01 | −2.5854E+02 | 8.6465E+02 |
| S9 | −2.6682E+00 | 7.2885E+00 | −3.7505E+01 | 1.7549E+02 | −5.4587E+02 |
| S10 | −7.8708E−01 | 1.0143E+00 | −2.9648E−01 | −1.1544E+00 | 1.9600E+00 |

| Surface number | A14 | A16 | A18 | A20 |
|---|---|---|---|---|
| S1 | −1.3698E+02 | 1.1587E+02 | −5.9081E+01 | 1.3748E+01 |
| S2 | −4.6454E+04 | 3.8567E+04 | 0.0000E+00 | 0.0000E+00 |
| S3 | 1.2653E+07 | −8.8776E+07 | 3.4027E+08 | −5.4436E+08 |
| S4 | −1.5436E+03 | 1.7842E+03 | 0.0000E+00 | 0.0000E+00 |
| S5 | 7.9551E+04 | −2.4667E+05 | 4.5888E+05 | −3.8549E+05 |
| S6 | −1.8235E+04 | 3.1731E+04 | −3.0694E+04 | 1.2651E+04 |
| S7 | −5.0705E+03 | 6.4765E+03 | −4.6313E+03 | 1.4182E+03 |
| S8 | −1.7119E+03 | 2.0127E+03 | −1.2994E+03 | 3.5485E+02 |
| S9 | 1.0449E+03 | −1.1856E+03 | 7.3015E+02 | −1.8750E+02 |
| S10 | −1.5035E+00 | 6.3419E−01 | −1.4230E−01 | 1.3296E−02 |

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion at different image heights. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve a good image quality.

EXAMPLE 6

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 6, an effective focal length f of the optical imaging system is 0.93 mm, an aperture value Fno of the optical imaging system is 2.27, an on-axis distance TTL from the object-side surface S1 of the first lens E1 to the imaging plane S13 is 3.14 mm, half of a diagonal length ImgH of an effective pixel area on the imaging plane S13 is 1.82 mm, and half of a maximal field-of-view Semi-FOV is 64.3°.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Refractive index | Abbe number | Focal length | Conic coefficient |
|---|---|---|---|---|---|---|---|
| OBJ | spherical | infinite | 700.0000 | | | | |
| S1 | aspheric | −12.6476 | 0.2823 | 1.55 | 56.1 | −1.90 | 78.6620 |
| S2 | aspheric | 1.1355 | 0.6288 | | | | 3.2144 |
| STO | spherical | infinite | −0.0292 | | | | |
| S3 | aspheric | 1.1878 | 0.4051 | 1.55 | 56.1 | 1.02 | −7.0099 |
| S4 | aspheric | −0.9207 | 0.0710 | | | | 3.5561 |
| S5 | aspheric | −7.0579 | 0.2500 | 1.68 | 19.3 | −2.62 | 67.3980 |
| S6 | aspheric | 2.4009 | 0.0636 | | | | −5.3656 |
| S7 | aspheric | 9.8514 | 0.4961 | 1.55 | 56.1 | 1.72 | 0.0605 |
| S8 | aspheric | −1.0219 | 0.0476 | | | | −0.3090 |
| S9 | aspheric | 0.7541 | 0.3403 | 1.67 | 20.4 | −5.04 | −0.9052 |
| S10 | aspheric | 0.5047 | 0.2674 | | | | −2.6105 |
| S11 | spherical | infinite | 0.2100 | 1.52 | 64.2 | | |
| S12 | spherical | infinite | 0.1097 | | | | |
| S13 | spherical | infinite | | | | | |

TABLE 12

| Surface number | A4 | A6 | A8 | A10 | A12 |
|---|---|---|---|---|---|
| S1 | 1.6696E+00 | −6.2545E+00 | 2.2194E+01 | −5.8043E+01 | 1.0729E+02 |
| S2 | 3.1127E+00 | −4.2004E+01 | 6.2869E+02 | −5.0407E+03 | 2.1696E+04 |
| S3 | −1.3548E−01 | 2.9344E+01 | −1.8009E+03 | 5.6614E+04 | −1.0806E+06 |
| S4 | −1.5852E+00 | 1.3377E+01 | −6.8272E+01 | 1.0199E+02 | 3.1968E+02 |
| S5 | −3.0365E+00 | 2.7912E+01 | −3.1033E+02 | 2.6078E+03 | −1.7053E+04 |
| S6 | −6.9314E−01 | −9.6168E+00 | 1.7210E+02 | −1.3662E+03 | 6.3567E+03 |
| S7 | 6.6158E−01 | −1.5688E+01 | 1.4183E+02 | −7.4485E+02 | 2.4407E+03 |
| S8 | −7.0504E−01 | −4.9670E−01 | 4.0689E+01 | −2.5854E+02 | 8.6465E+02 |
| S9 | −2.6682E+00 | 7.2885E+00 | −3.7505E+01 | 1.7549E+02 | −5.4587E+02 |
| S10 | −7.8708E−01 | 1.0143E+00 | −2.9648E−01 | −1.1544E+00 | 1.9600E+00 |

| Surface number | A14 | A16 | A18 | A20 |
|---|---|---|---|---|
| S1 | −1.3698E+02 | 1.1587E+02 | −5.9081E+01 | 1.3748E+01 |
| S2 | −4.6454E+04 | 3.8567E+04 | 0.0000E+00 | 0.0000E+00 |
| S3 | 1.2653E+07 | −8.8776E+07 | 3.4027E+08 | −5.4436E+08 |
| S4 | −1.5436E+03 | 1.7842E+03 | 0.0000E+00 | 0.0000E+00 |
| S5 | 7.9551E+04 | −2.4667E+05 | 4.5888E+05 | −3.8549E+05 |
| S6 | −1.8235E+04 | 3.1731E+04 | −3.0694E+04 | 1.2651E+04 |
| S7 | −5.0705E+03 | 6.4765E+03 | −4.6313E+03 | 1.4182E+03 |
| S8 | −1.7119E+03 | 2.0127E+03 | −1.2994E+03 | 3.5485E+02 |
| S9 | 1.0449E+03 | −1.1856E+03 | 7.3015E+02 | −1.8750E+02 |
| S10 | −1.5035E+00 | 6.3419E−01 | −1.4230E−01 | 1.3296E−02 |

Figure 12A:
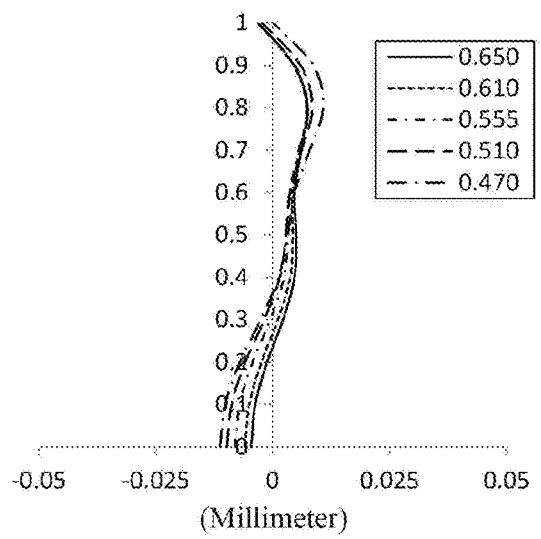
FIGS. 12A to 12D illustrate a longitudinal aberration curve, an astigmatic curve, a distortion curve, and a lateral color curve of the optical imaging system of the Example 6, respectively.
Figure 12B:
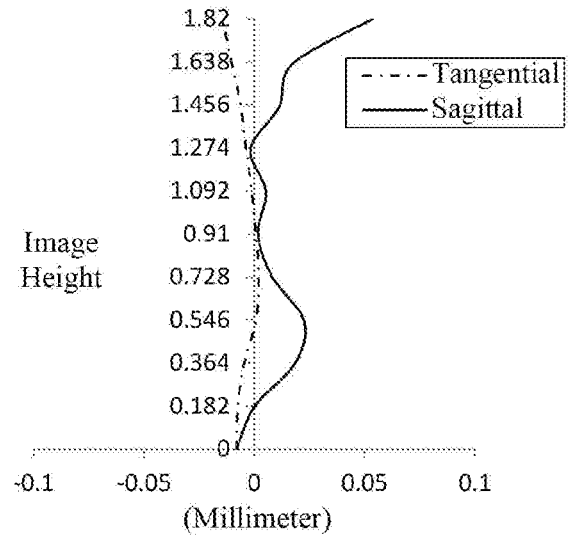
Figure 12C:
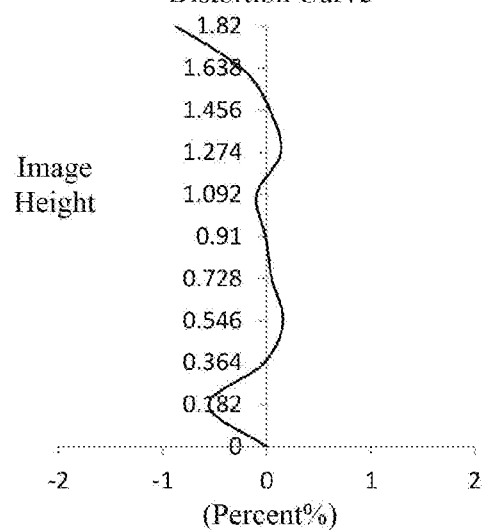
Figure 12D:
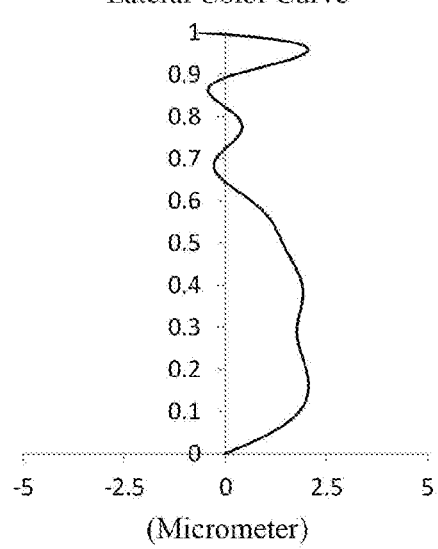

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion at different image heights. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve a good image quality.

EXAMPLE 7

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a first lens E1, a stop STO, a second lens E2, a third lens E3, a fourth lens E4, a fifth lens E5 and an optical filter E6, which are sequentially arranged from an object side to an image side along an optical axis.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a positive refractive power, an object-side surface S9 thereof is a convex surface, and an image-side surface S10 thereof is a concave surface. The optical filter E6 has an object-side surface S11 and an image-side surface S12. The optical imaging system has an imaging plane S13, and light from an object sequentially passes through the respective surfaces S1 to S12 and is finally imaged on the imaging plane S13.

In example 7, an effective focal length f of the optical imaging system is 0.89 mm, an aperture value Fno of the optical imaging system is 2.27, an on-axis distance TTL from the object-side surface S1 of the first lens E1 to the imaging plane S13 is 3.08 mm, half of a diagonal length ImgH of an effective pixel area on the imaging plane S13 is 1.82 mm, and half of a maximal field-of-view Semi-FOV is 64.3°.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Refractive index | Abbe number | Focal length | Conic coefficient |
|---|---|---|---|---|---|---|---|
| OBJ | spherical | infinite | 700.0000 | | | | |
| S1 | aspheric | −13.4476 | 0.2614 | 1.55 | 56.1 | −1.90 | 98.7790 |
| S2 | aspheric | 1.1288 | 0.6057 | | | | 3.4131 |
| STO | spherical | infinite | −0.0155 | | | | |
| S3 | aspheric | 1.2090 | 0.3824 | 1.55 | 56.1 | 1.01 | −7.9126 |
| S4 | aspheric | −0.8927 | 0.0816 | | | | 3.6390 |
| S5 | aspheric | −5.9240 | 0.2684 | 1.68 | 19.3 | −2.40 | 93.7060 |
| S6 | aspheric | 2.2870 | 0.0677 | | | | −6.7534 |
| S7 | aspheric | 8.3477 | 0.4657 | 1.55 | 56.1 | 2.06 | 12.3331 |
| S8 | aspheric | −1.2732 | 0.0613 | | | | −0.0687 |
| S9 | aspheric | 0.6956 | 0.2940 | 1.67 | 20.4 | 10.00 | −0.8040 |
| S10 | aspheric | 0.6452 | 0.2770 | | | | −2.1544 |
| S11 | spherical | infinite | 0.2100 | 1.52 | 64.2 | | |
| S12 | spherical | infinite | 0.1219 | | | | |
| S13 | spherical | infinite | | | | | |

TABLE 14

| Surface number | A4 | A6 | A8 | A10 | A12 |
|---|---|---|---|---|---|
| S1 | 1.4014E+00 | −3.7904E+00 | 6.3292E+00 | 8.9986E−01 | −2.8086E+01 |
| S2 | 4.1917E+00 | −5.9410E+01 | 7.1479E+02 | −4.8704E+03 | 1.8315E+04 |
| S3 | 2.6800E−01 | −1.7154E+01 | 3.1943E+02 | −2.1610E+03 | −7.7460E+04 |
| S4 | −9.0939E−01 | −9.4570E+00 | 2.3286E+02 | −1.9051E+03 | 7.6256E+03 |
| S5 | −1.8329E+00 | −2.4981E+01 | 7.5781E+02 | −1.1050E+04 | 9.8139E+04 |
| S6 | −7.0485E−01 | −7.8713E+00 | 1.0652E+02 | −5.9625E+02 | 1.8157E+03 |
| S7 | 3.9210E−01 | −9.4429E+00 | 7.5901E+01 | −3.1410E+02 | 7.2510E+02 |
| S8 | −4.1243E+00 | 4.8800E+01 | −3.2556E+02 | 1.3607E+03 | −3.5615E+03 |
| S9 | −3.9312E+00 | 2.8477E+01 | −1.6536E+02 | 6.0395E+02 | −1.4318E+03 |
| S10 | −1.4272E−01 | −2.0408E+00 | 6.3678E+00 | −9.8879E+00 | 9.3024E+00 |

TABLE 14-continued

| Surface number | A14 | A16 | A18 | A20 |
|---|---|---|---|---|
| S1 | 6.0351E+01 | −6.3169E+01 | 3.3935E+01 | −7.4797E+00 |
| S2 | −3.4637E+04 | 2.5430E+04 | 0.0000E+00 | 0.0000E+00 |
| S3 | 1.8533E+06 | −1.7859E+07 | 8.4845E+07 | −1.6233E+08 |
| S4 | −1.5421E+04 | 1.2536E+04 | 0.0000E+00 | 0.0000E+00 |
| S5 | −5.5105E+05 | 1.8829E+06 | −3.5372E+06 | 2.7856E+06 |
| S6 | −2.9436E+03 | 1.8054E+03 | 1.0663E+03 | −1.5059E+03 |
| S7 | −9.3087E+02 | 5.6196E+02 | −2.2233E+01 | −9.2887E+01 |
| S8 | 5.7906E+03 | −5.6378E+03 | 2.9914E+03 | −6.6110E+02 |
| S9 | 2.2180E+03 | −2.1730E+03 | 1.2164E+03 | −2.9423E+02 |
| S10 | −5.5139E+00 | 2.0132E+00 | −4.1317E−01 | 3.6388E−02 |

Figure 14C:
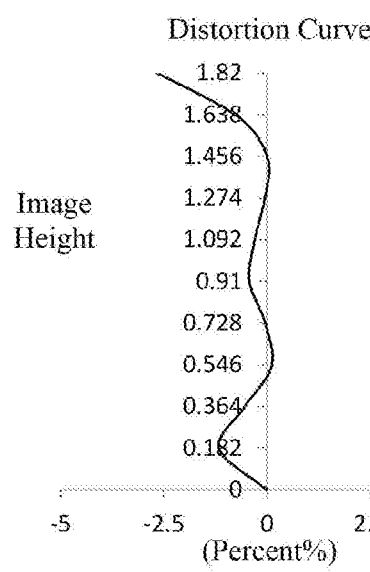
Figure 14D:
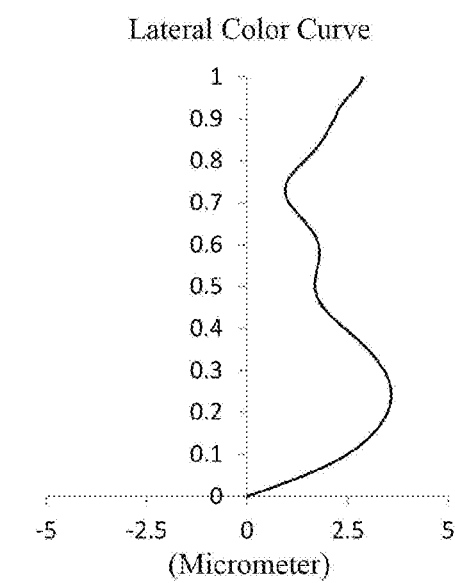

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion at different image heights. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve a good image quality.

In view of the above, examples 1 to 7 respectively satisfy the relationship shown in Table 15.

TABLE 15

| Condition | Example | | | | | | |
|---|---|---|---|---|---|---|---|
| | 1 | 2 | 3 | 4 | 5 | 6 | 7 |
| f2/CT2 | 2.82 | 2.55 | 2.58 | 2.73 | 2.75 | 2.52 | 2.63 |
| f23/f | 1.32 | 1.18 | 1.26 | 1.17 | 1.41 | 1.50 | 1.58 |
| f4/R8 | −1.78 | −1.47 | −1.48 | −1.34 | −1.57 | −1.69 | −1.62 |
| R2/R3 | 1.27 | 0.99 | 0.96 | 1.68 | 0.93 | 0.96 | 0.93 |
| R9/R10 | 2.14 | 2.13 | 2.12 | 1.88 | 1.64 | 1.49 | 1.08 |
| (f1/CT1)/4 | −3.54 | −1.82 | −1.77 | −1.90 | −1.70 | −1.68 | −1.81 |
| (CT2/T23)/2 | 2.21 | 3.38 | 3.33 | 4.20 | 3.61 | 2.85 | 2.34 |
| (T23 + T34)/T45 | 5.17 | 5.78 | 4.52 | 3.88 | 2.07 | 2.83 | 2.44 |
| CT4/CT5 | 1.88 | 2.23 | 2.21 | 2.47 | 1.58 | 1.46 | 1.58 |
| TTL/ΣCT | 1.90 | 1.72 | 1.75 | 1.67 | 1.70 | 1.77 | 1.84 |
| ΣAT/T12 | 1.53 | 1.67 | 1.65 | 1.50 | 1.32 | 1.30 | 1.21 |
| ΣCT/CT4 | 2.75 | 2.94 | 2.97 | 2.98 | 3.10 | 3.58 | 3.59 |
| ET3/CT3 | 1.57 | 1.33 | 1.37 | 1.26 | 1.26 | 1.29 | 1.27 |
| CT4/ET4 | 2.80 | 2.11 | 3.03 | 1.72 | 1.61 | 1.98 | 1.86 |
| SAG42/SAG22 | 2.61 | 2.34 | 2.61 | 4.83 | 1.99 | 1.93 | 1.86 |
| SAG12/SAG11 | 2.20 | 1.67 | 1.76 | 1.94 | 1.21 | 1.01 | 1.16 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, substantially consisting of:
    a first lens having a negative refractive power with a concave object-side surface and a concave image-side surface;
    a stop;
    a second lens having a refractive power;
    a third lens having a negative refractive power;
    a fourth lens having a refractive power with a convex object-side surface and a convex image-side surface; and
    a fifth lens having a refractive power;
    wherein 45.0° ≤Semi-FOV<65.0° and 2.5≤f2/CT2≤3.0,
    where Semi-FOV is half of a maximal field-of-view of the optical imaging system, f2 is an effective focal length of the second lens and CT2 is a center thickness of the second lens along the optical axis.

2. The optical imaging system according to claim 1, wherein 1.0<f23/f≤1.6,
    where f23 is a combined focal length of the second lens and the third lens and f is an effective focal length of the optical imaging system.

3. The optical imaging system according to claim 1, wherein $-1.8 \leq f4/R8 \leq -1.3$,
where f4 is an effective focal length of the fourth lens and R8 is a radius of curvature of the image-side surface of the fourth lens.

4. The optical imaging system according to claim 1, wherein $-3.6<(f1/CT1)/4<-1.6$,
where f1 is an effective focal length of the first lens and CT1 is a center thickness of the first lens along the optical axis.

5. The optical imaging system according to claim 1, wherein $2.2<(CT2/T23)/2 \leq 4.2$,
where CT2 is the center thickness of the second lens along the optical axis and T23 is a spaced interval between the second lens and the third lens along the optical axis.

6. The optical imaging system according to claim 1, wherein $1.4<CT4/CT5<2.5$,
where CT4 is a center thickness of the fourth lens along the optical axis and CT5 is a center thickness of the fifth lens along the optical axis.

7. The optical imaging system according to claim 1, wherein $1.6<TTL/\Sigma CT<2.0$,
where TTL is an on-axis distance from the object-side surface of the first lens to an imaging plane of the optical imaging system and $\Sigma CT$ is a sum of center thicknesses of the first to fifth lenses along the optical axis.

8. The optical imaging system according to claim 1, wherein $1.2<\Sigma AT/T12<1.7$,
where $\Sigma AT$ is a sum of spaced intervals along the optical axis between each two adjacent lenses of the first lens to the fifth lens and T12 is a spaced interval between the first lens and the second lens along the optical axis.

9. The optical imaging system according to claim 1, wherein $2.7<\Sigma CT/CT4 \leq 3.6$,
where $\Sigma CT$ is a sum of center thicknesses of the first to fifth lenses along the optical axis and CT4 is a center thickness of the fourth lens along the optical axis.

10. The optical imaging system according to claim 1, wherein $1.2<ET3/CT3 \leq 1.6$,
where ET3 is an edge thickness of the third lens and CT3 is a center thickness of the third lens along the optical axis.

11. The optical imaging system according to claim 1, wherein $1.6<CT4/ET4<3.1$,
where CT4 is a center thickness of the fourth lens along the optical axis and ET4 is an edge thickness of the fourth lens.

12. The optical imaging system according to claim 1, wherein $1.8<SAG42/SAG22<4.9$,
where SAG42 is an on-axis distance from an intersection of the image-side surface of the fourth lens and the optical axis to a vertex of an effective radius of the image-side surface of the fourth lens and SAG22 is an on-axis distance from an intersection of an image-side surface of the second lens and the optical axis to a vertex of an effective radius of the image-side surface of the second lens.

13. The optical imaging system according to claim 1, wherein $1.0<SAG12/SAG11 \leq 2.2$,
where SAG12 is an on-axis distance from an intersection of the image-side surface of the first lens and the optical axis to a vertex of an effective radius of the image-side surface of the first lens and SAG11 is an on-axis distance from an intersection of the object-side surface of the first lens and the optical axis to a vertex of an effective radius of the object-side surface of the first lens.

14. The optical imaging system according to claim 1, wherein $1.6<n3$ and $1.6<n5$,
where n3 is a refractive index of the third lens and n5 is a refractive index of the fifth lens.

15. An optical imaging system, sequentially from an object side to an image side of the optical imaging system along an optical axis, comprising:
a first lens having a negative refractive power with a concave object-side surface and a concave image-side surface;
a stop;
a second lens having a refractive power;
a third lens having a negative refractive power;
a fourth lens having a refractive power with a convex object-side surface and a convex image-side surface; and
a fifth lens having a refractive power;
wherein $45.0° \leq \text{Semi-FOV}<65.0°$, $2.5 \leq f2/CT2 \leq 3.0$ and $2.0<(T23+T34)/T45<5.8$,
where Semi-FOV is half of a maximal field-of-view of the optical imaging system, f2 is an effective focal length of the second lens, CT2 is a center thickness of the second lens along the optical axis, T23 is a spaced interval between the second lens and the third lens along the optical axis, T34 is a spaced interval between the third lens and the fourth lens along the optical axis and T45 is a spaced interval between the fourth lens and the fifth lens along the optical axis.

16. The optical imaging system according to claim 15, wherein $1.0<f23/f \leq 1.6$,
where f23 is a combined focal length of the second lens and the third lens and f is an effective focal length of the optical imaging system.

17. The optical imaging system according to claim 15, wherein $-1.8 \leq f4/R8 \leq -1.3$,
where f4 is an effective focal length of the fourth lens and R8 is a radius of curvature of the image-side surface of the fourth lens.

18. The optical imaging system according to claim 15, wherein $0.9 \leq R2/R3 \leq 1.7$,
where R2 is a radius of curvature of the image-side surface of the first lens and R3 is a radius of curvature of an object-side surface of the second lens.

19. The optical imaging system according to claim 15, wherein $1.0<R9/R10 \leq 2.2$,
where R9 is a radius of curvature of an object-side surface of the fifth lens and R10 is a radius of curvature of an image-side surface of the fifth lens.

20. The optical imaging system according to claim 15, wherein $1.6<TTL/\Sigma CT<2.0$,
where TTL is an on-axis distance from the object-side surface of the first lens to an imaging plane of the optical imaging system and $\Sigma CT$ is a sum of center thicknesses of the first to fifth lenses along the optical axis.

* * * * *